US006956714B2

(12) United States Patent
Oohara et al.

(10) Patent No.: US 6,956,714 B2
(45) Date of Patent: Oct. 18, 2005

(54) LIBRARY APPARATUS FOR CHARGING OR DISCHARGING A PLURALITY OF CARTRIDGES AT THE SAME TIME

(75) Inventors: Tsuneyoshi Oohara, Kawasaki (JP); Ken-ichiro Tango, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 58 days.

(21) Appl. No.: 10/370,628

(22) Filed: Feb. 24, 2003

(65) Prior Publication Data

US 2004/0017633 A1 Jan. 29, 2004

(30) Foreign Application Priority Data

Jul. 26, 2002 (JP) .............................. 2002-218474

(51) Int. Cl.[7] .......................................... G11B 15/68
(52) U.S. Cl. ................................... 360/92; 369/30.93
(58) Field of Search ............................ 360/92; 369/11

(56) References Cited

U.S. PATENT DOCUMENTS

| 5,644,445 A | 7/1997 | Ishikawa |
| 5,940,243 A | 8/1999 | Kanetsuku et al. |
| 6,088,189 A | 7/2000 | Utsumi et al. |

FOREIGN PATENT DOCUMENTS

| JP | 05-189850 | 7/1993 |
| JP | 10-241240 | 9/1998 |
| JP | 10-241241 | 9/1998 |
| JP | 2000-149382 | 5/2000 |
| JP | 2000-331408 | 11/2000 |
| JP | 2001-6258 | 1/2001 |

OTHER PUBLICATIONS

Office Action from Japanese Patent Office dated Mar. 1, 2005.

Primary Examiner—A. J. Heinz
(74) Attorney, Agent, or Firm—Westerman, Hattori, Daniels & Adrian, LLP

(57) ABSTRACT

A library apparatus in which a plurality of cartridges can be charged or discharged at the same time, with a simple and compact configuration of a magazine load/unload portion, is disclosed. A plurality of cartridges each containing a storage medium are accommodated in a magazine. The cartridges are moved to a drive unit by a built-in accessor thereby to process the storage media. A charge/discharge mechanism for setting the magazine in the apparatus is configured of an outer door arranged on the front of a frame unit for establishing communication between the exterior and the interior of the apparatus and adapted to be opened/closed manually from outside, an inner door arranged on the back of the frame unit and opened/closed mechanically by the insert/discharge operation of the magazine, and a lock mechanism for the inner and outer doors arranged under the frame unit.

14 Claims, 21 Drawing Sheets

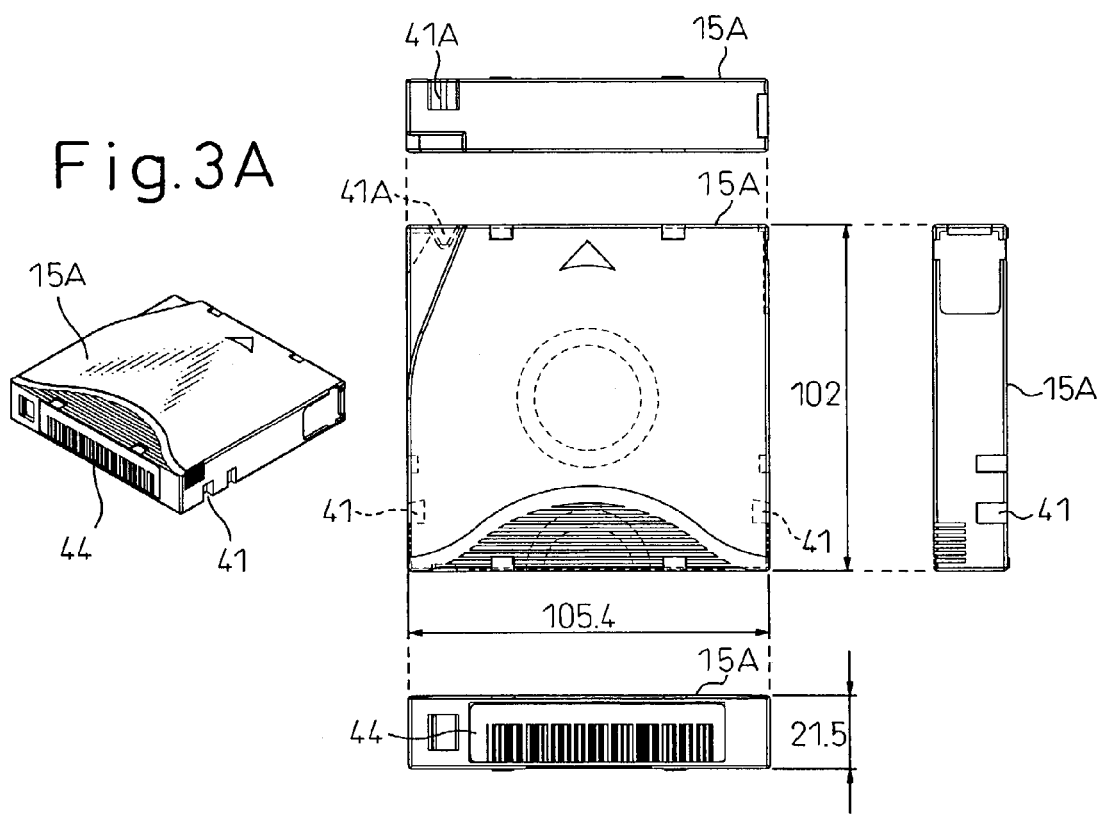

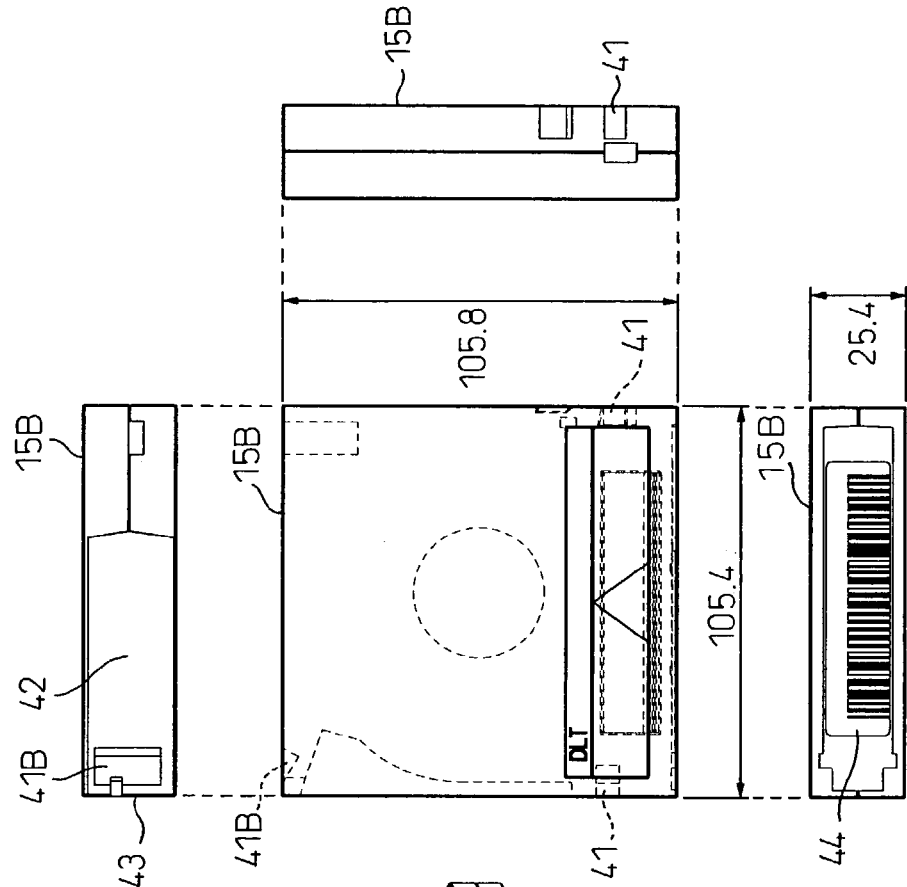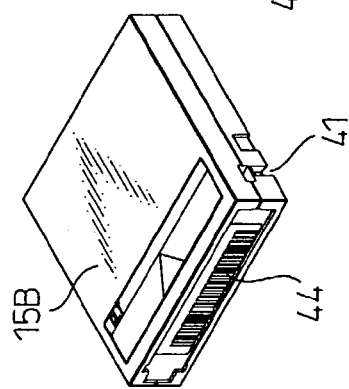

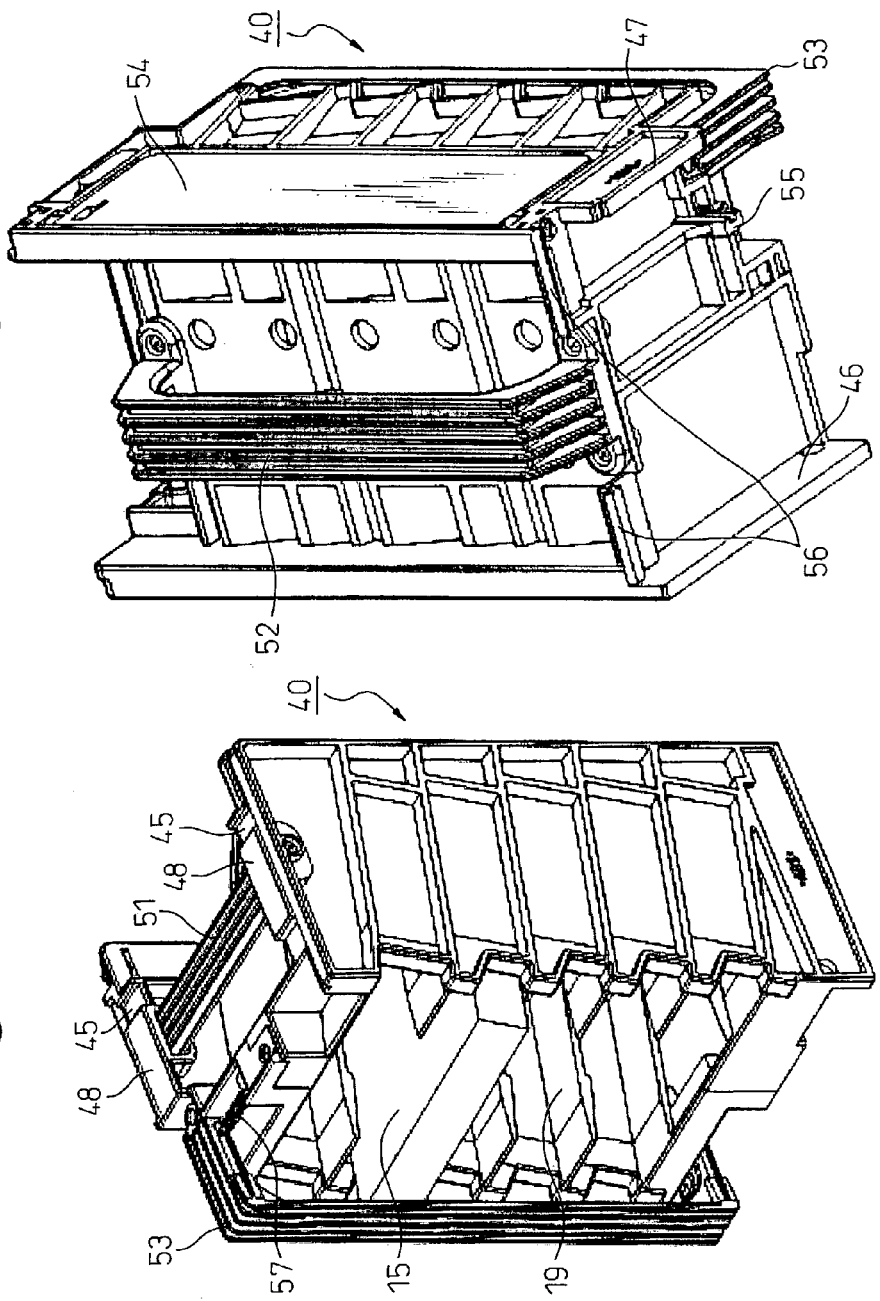

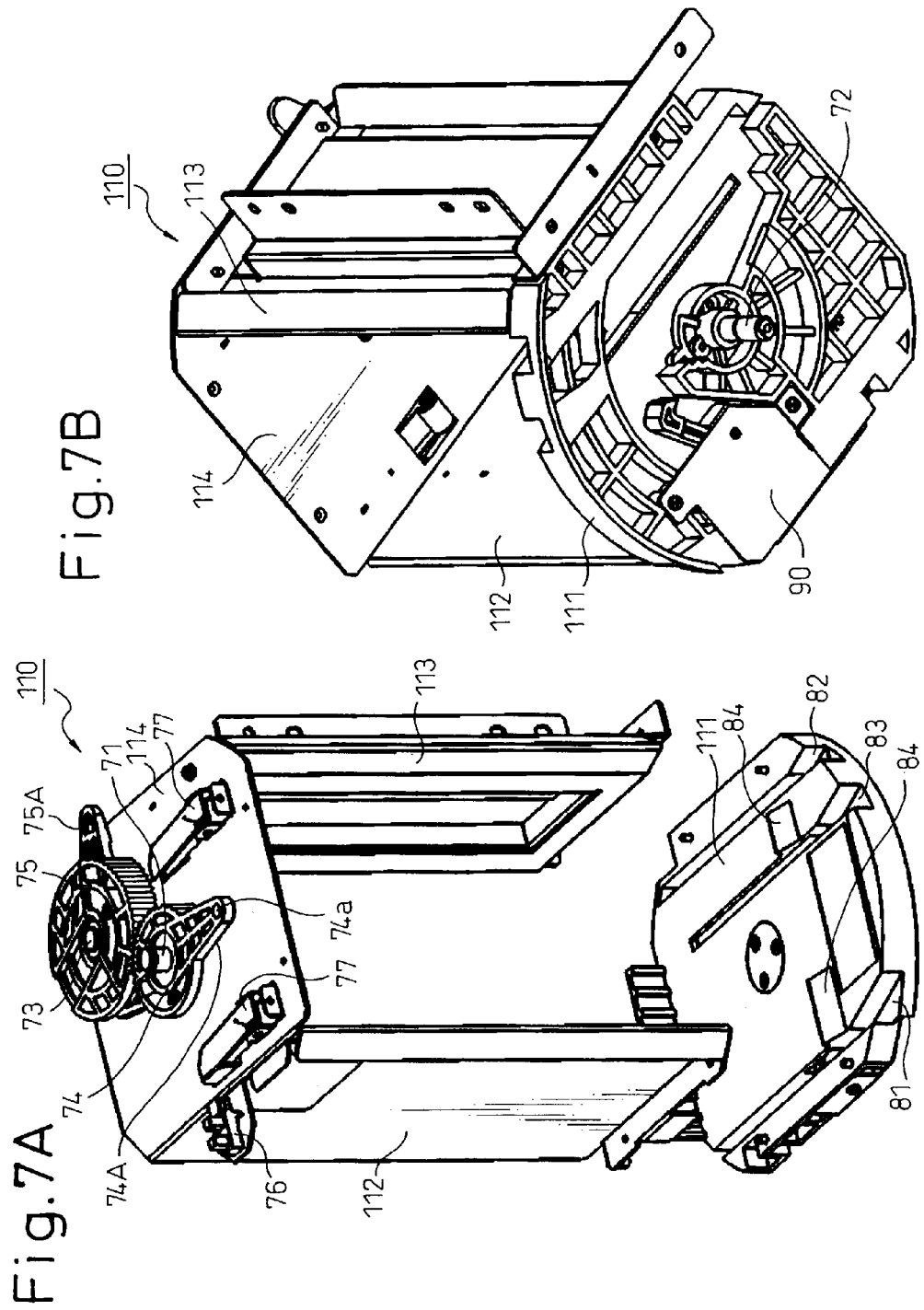

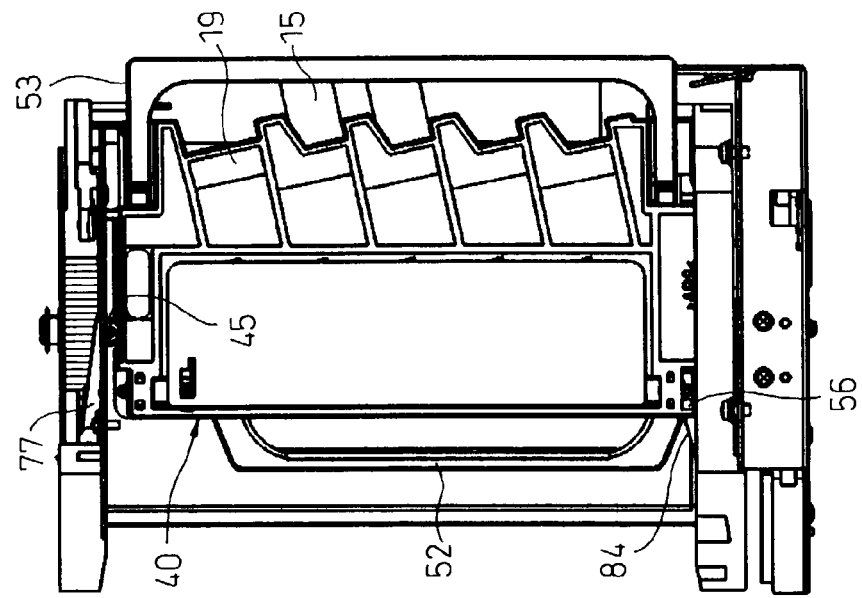
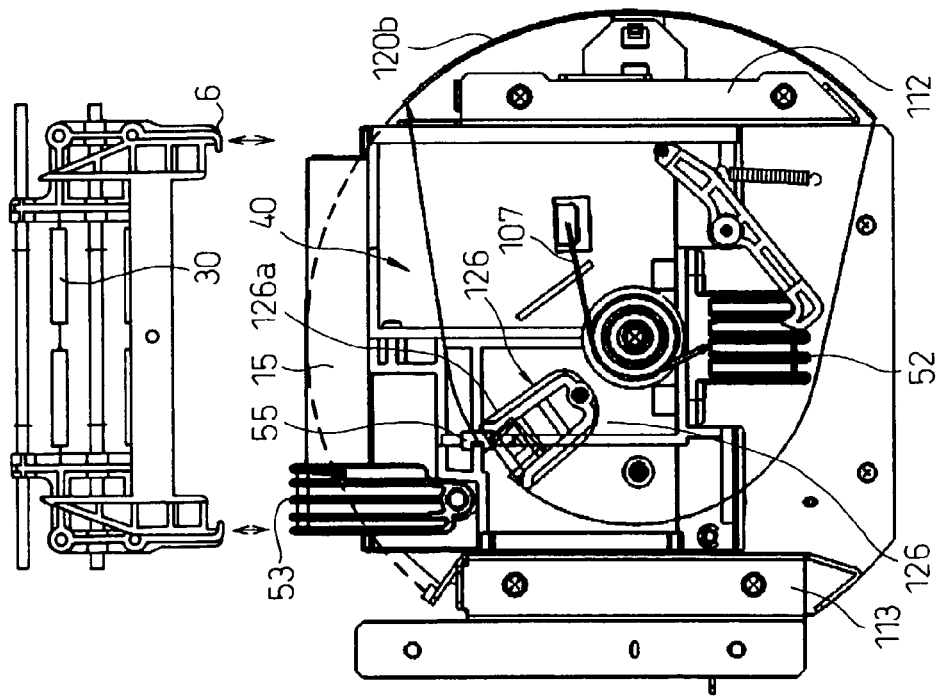

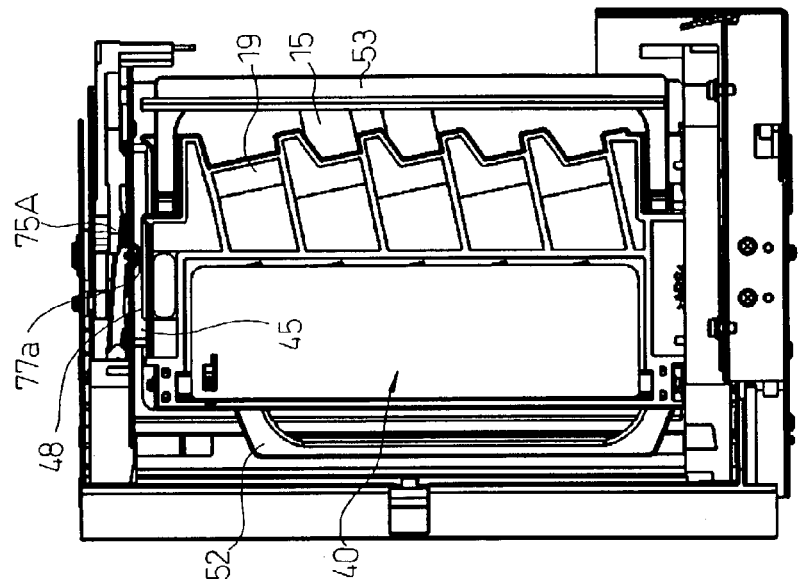
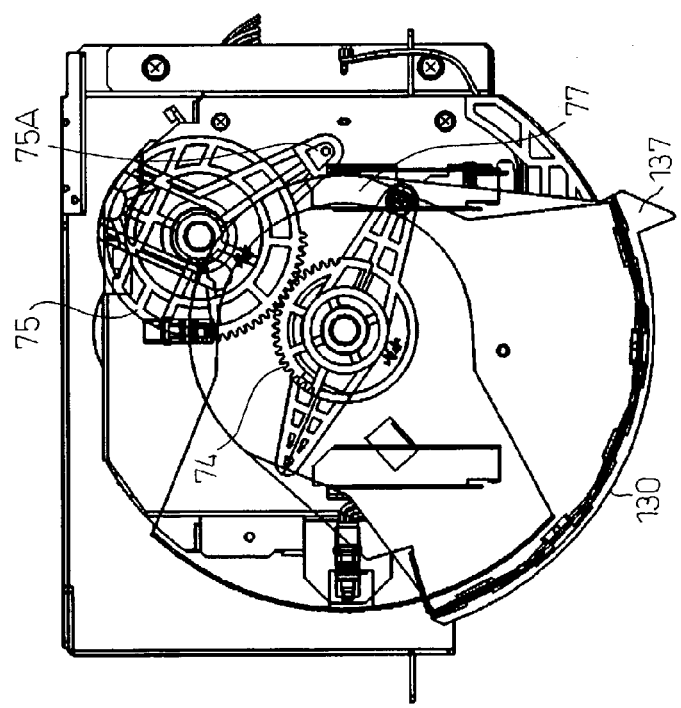

LIBRARY APPARATUS FOR CHARGING OR DISCHARGING A PLURALITY OF CARTRIDGES AT THE SAME TIME

CROSS-REFERENCE TO RELATED APPLICATION

This application claims priority from, and incorporates by reference the entire disclosure of, Japanese Patent Application No. 2002-218474 filed on Jul. 26, 2002.

BACKGROUND OF THE INVENTION

1. Field of the Invention

The present invention relates to a library apparatus and, in particular, to a library apparatus for storing a multiplicity of cartridges, having a recording medium built therein, and moving the cartridges to a drive unit by a carriage mechanism thereby to read/write the internal storage media, the library apparatus being adapted to set therein at least a magazine capable of accommodating a plurality of cartridges.

2. Description of the Related Art

With the increase in the amount of information processed by computer systems, a conventional library apparatus comprising cartridge-type storage media (hereinafter referred to simply as cartridges), with magnetic tape built therein, is known as an information storage device for storing a large amount of information. This library apparatus is configured of an access unit for charging and discharging the-cartridges, a drive unit for recording/reproducing data in and from the storage media in the cartridges and an accessor robot (hereinafter referred to simply as the accessor) for moving the cartridges between the access unit and the drive unit.

A conventional ordinary library apparatus has a plurality of internal cells for accommodating a multiplicity of cartridges. Also, this library apparatus is capable of charging from outside or discharging outside a plurality of cartridges at the same time. For this purpose, the library apparatus generally comprises an access unit (hereinafter referred to as a CAS (Cartridge Access Station)) for charging/discharging a magazine accommodating a plurality of the cartridges.

In the process for charging a magazine accommodating a plurality of the cartridges from the CAS into the library apparatus, the first step is for the operator to mount the magazine on the outer periphery of a magazine drum in the access unit from the outside of the apparatus (the operator side of the apparatus). Then, the magazine drum is rotationally driven by a drive motor so that each cartridge accommodated in the magazine is directed inward of the apparatus (toward the space in which the accessor is to move). In discharging the magazine accommodating a plurality of the cartridges by the CAS, on the contrary, the magazine drum is rotationally driven by the drive motor so that the magazine to be discharged is directed outward of the apparatus, and the particular magazine is retrieved by the operator.

In a library apparatus of another type having a rotatable tray outside of the apparatus, a magazine is mounted on a tray tilted toward an external space, after which the tray is returned so that each cartridge accommodated in the magazine is directed inward of the apparatus (toward the space in which the accessor is to move). After that, a pivoted door arranged in the apparatus for separating the interior and the exterior of the apparatus from each other is opened by being rotationally driven by the drive motor, and the magazine is opened inward of the apparatus thereby to charge a plurality of the cartridges. In discharging the magazine from the CAS, on the contrary, the pivoted door is rotationally driven by the drive motor, and after thus separating the magazine from the interior of the apparatus, the tray is rotated and tilted toward the external space. In this way, the magazine is retrieved to discharge the cartridges.

This magazine is provided with a safety stopper mechanism for preventing a plurality of the magazines from jumping out of the magazine in transit. The conventional safety stopper mechanism for the cartridges in the magazine can be one of several types. In one safety stopper mechanism, a lock lever for preventing the cartridges from jumping out is hooked in a notch (depression) formed in each cartridge. Another safety stopper mechanism uses a spring plate to fix the cartridges under pressure.

The CAS for the library apparatuses described above has the following structural problem.

First, in the CAS having a magazine drum, the magazine is mounted in the drum and required to be rotated with the drum at the time of charging/discharging the cartridges. Therefore, there are needed a drive mechanism for rotationally driving the whole drum with the magazines mounted therein and a support structure for rotatably supporting the drum. This poses the problem of a complicated or bulky library apparatus.

Next, in the CAS having a rotatable tray outside of the apparatus, the pivoted door is rotated with the magazine mounted thereon and, therefore, the problem is posed that a space is required to prevent the pivoted door from interfering with the magazine and the cartridges mounted in the magazines. This CAS further requires a space for rotating the tray with the magazine mounted thereon on the one hand and a drive mechanism for rotationally driving the pivoted door, thereby leading to the problem of a complicated and bulky library apparatus.

The two types of CAS described above both use a motor for rotational drive, and therefore the size reduction in the drive mechanism is limited. Also, the need for drive control leads to the problem that the library apparatus becomes bulky and complicated.

The safety stopper mechanism for the cartridges including a lock lever hooked in the cartridges used for the conventional magazine, on the other hand, requires a solenoid and a motor exclusively used for unlocking. This increases the number of parts of the unlocking mechanism and poses the problem of a higher cost and a possible malfunction. In the safety stopper mechanism for cartridges using a spring plate pressed against the cartridges, on the other hand, the spring plate cannot fix the cartridges firmly. In the case where the magazine are shaken or otherwise similarly treated, for example, the cartridges are liable to jump out of the magazine.

SUMMARY OF THE INVENTION

This invention is intended to obviate these problems, and a first object thereof is to provided a library apparatus having a simple and compact configuration using no motor for the drive mechanism of the pivoted door to thereby reduce the space of the magazine charge/discharge mechanism. A second object of the invention is to provide a library apparatus having a simple mechanism for preventing the cartridges from jumping out of the magazine, wherein access to the cartridge transportation mechanism in the apparatus is not hampered by the magazine which has advanced into the library apparatus.

In order to achieve the above-mentioned objects, the library apparatus according to the following first to fifth aspects of the invention is provided.

According to a first aspect of the invention, there is provided a library apparatus comprising a drive unit for handling the cartridges each accommodating a storage medium, a plurality of cells for accommodating the cartridges, an accessor for transporting the cartridges, and a mechanism adapted to charge/discharge the magazine capable of accommodating a plurality of cartridges, wherein a magazine charge/discharge mechanism is constituted of a frame unit having a space for inserting the magazine is arranged in a communication space for establishing communication between the internal space for operation of the accessor and the external space for the library apparatus, and an inner shutter mounted on the frame unit for opening/closing the internal space side of the magazine insertion space, and wherein as long as the magazine is not set, the inner shutter is closed and occupies the area which might be occupied by the magazine after being set, the inner shutter having a first engaging portion for engaging a part of the magazine, the magazine having a second engaging portion, the first and second engaging portions being adapted to engage each other thereby to open the inner shutter when the magazine is inserted into the insertion space, the inner shutter being fully open when the magazine reaches the set position in the insertion space.

According to a second aspect based on the first aspect of the invention, there is provided a library apparatus, wherein the inner shutter is configured as a pivoted door mounted on a rotary shaft protruded from the frame unit and includes a curved shutter portion, the first engaging portion making up a U-shaped lever fixed on the bottom plate portion of the inner shutter, the second engaging portion making up a protrusion from the bottom portion of the magazine, the lever having an opening located on a line along which the protrusion advances when the magazine is inserted into the insertion space.

According to a third aspect based on the first or second aspect of the invention, there is provided a library apparatus, wherein the frame unit includes an outer shutter for opening/closing the external space side of the magazine insertion space, the outer shutter is configured as a pivoted door mounted on the rotary shaft protruded from the frame unit outside of the inner shutter, the outer shutter having a shutter portion having a larger radius than the curved inner shutter portion.

According to a fourth aspect based on any of the first to third aspects of the invention, there is provided a library apparatus wherein the magazine includes a plurality of positioning grooves on the upper surface thereof and wherein the upper plate of the frame unit includes a plurality of holding levers adapted to engage the positioning grooves when the magazine reaches a set position, the upper plate of the frame unit further including a first gear fitted on the rotary shaft and operatively interlocked with the motion of the outer shutter and a second gear in mesh with the first gear, the first gear and the second gear being operated in collaboration with each other by closing the outer shutter when the magazine is set in position, the holding levers being fixed by use of an arm protruded from the first gear and an arm protruded from the second gear thereby to fix the magazine in position.

According to a fifth aspect based on the third aspect of the invention, there is provided a library apparatus further comprising a cartridge removal preventive lever arranged at the cartridge inlet/outlet of the magazine in the direction crossing the inlet/outlet for preventing the cartridges from jumping out of the magazine, the cartridge removal preventive lever being retreated from the front of the inlet/outlet by the closing operation of the outer shutter with the magazine set in position.

The library apparatus according to this invention has the following advantages.

(1) The working space of the accessor in the library apparatus directly communicates with the external space on the operator side, so that the cartridges charged by the magazine can be retrieved directly into the drive unit by the accessor from the working space. Thus, a plurality of cartridges can be charged or discharged at the same time with a very simple, compact configuration.

(2) The inner shutter unit is opened/closed or locked in operatively interlocked relation with the charge/discharge of the magazine. In the case where the magazine is removed, therefore, the closed state of the internal space can be positively held and, therefore, foreign matter can be kept off from the working space of the accessor, thereby making it possible to secure operator safety.

(3) In view of the fact that the inner shutter unit is opened/closed in operatively interlocked relation with the magazine charge/discharge operation, the area where the magazine is set in the apparatus and the rotational position of the inner shutter unit can be overlapped with each other. Also, since none of the mechanisms uses a motor, a very simple, compact configuration can be implemented.

(4) The outer shutter unit cannot be closed unless the magazine is set in position in the CAS, and therefore the erroneous charge of the magazine is prevented.

(5) When the magazine is set in position in the CAS and the outer shutter unit is closed, the operation of opening the outer shutter unit is inhibited by a lock mechanism. Therefore, the magazine cannot be retrieved at the time of the accessor accessing to the CAS, thereby making it possible to secure the safety of the operator.

(6) The provision of a mechanism for detecting that the magazine has been set in position makes it possible to detect the set state of the magazine in an operatively interlocked relation with the hold operation of a magazine holding mechanism. Therefore, the accessor can be operated only after detecting that the magazine is completely set, thereby making it possible to secure operator safety.

(7) The magazine can be provided with a mechanism for positively preventing the cartridges from jumping out, thereby greatly contributing to cartridge protection. Due to the small number of parts and the simple structure, the cost is reduced as compared with the prior art. Also, in view of the fact that the cartridge can be prevented from jumping out before the outer shutter unit of the CAS is closed after the magazine is charged into the apparatus, any trouble in the apparatus can be prevented.

BRIEF DESCRIPTION OF THE DRAWINGS

The present invention will be more clearly understood from the description as set forth below with reference to the accompanying drawings, wherein:

FIG. 3A is a perspective view taken from the rear side of a LTO medium;

FIG. 3B includes a front view, a plan view, a rear view and a side view of a LTO medium;

FIG. 4A is a perspective view taken from the rear side of a DLT medium;

FIG. 4B includes a front view, a plan view, a rear view and a side view of a DLT medium;

FIG. 6A is a perspective view taken from above the front side of the magazine according to the invention;

FIG. 6B is a perspective view taken from under the rear side of the magazine shown in FIG. 6A;

FIG. 7A is an exploded perspective view showing a configuration of the frame unit of the CAS;

FIG. 7B is a perspective view taken from the bottom side of the frame unit shown in FIG. 7A;

FIG. 16A is a perspective plan view showing the state in which the magazine is inserted further into the apparatus from the state of FIG. 15A and has reached the set position;

FIG. 16B is a perspective side view showing the state of FIG. 16A;

FIG. 20A is a perspective plan view for explaining that the outer shutter unit cannot be closed as the magazine holding lever is in contact with the second gear in the case where the magazine is not fully inserted into the apparatus;

FIG. 20B is a perspective side view of the state shown in FIG. 20A;

DESCRIPTION OF THE PREFERRED EMBODIMENTS

Embodiments of the present invention, based on specific examples, will be explained in detail, below, with reference to the accompanying drawings.

Figure 1A:
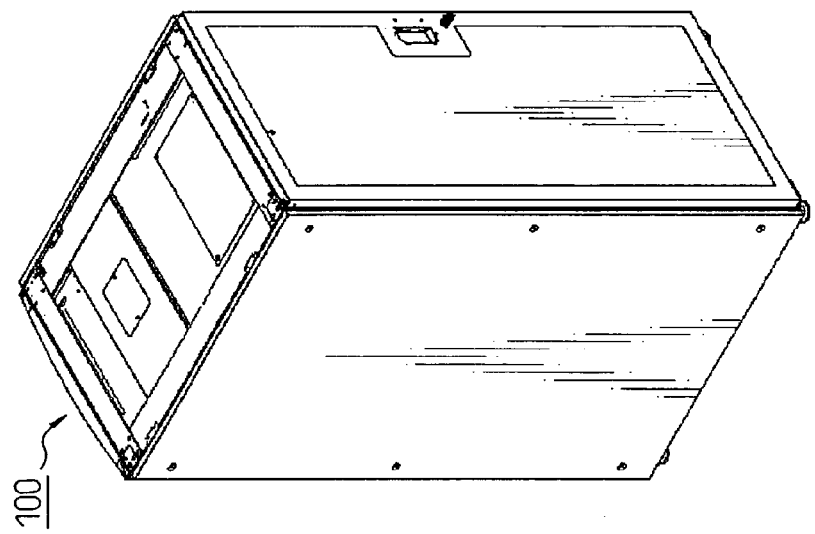
FIG. 1A is a perspective view taken from the front side of a magnetic tape library apparatus according to this invention.
Figure 1B:
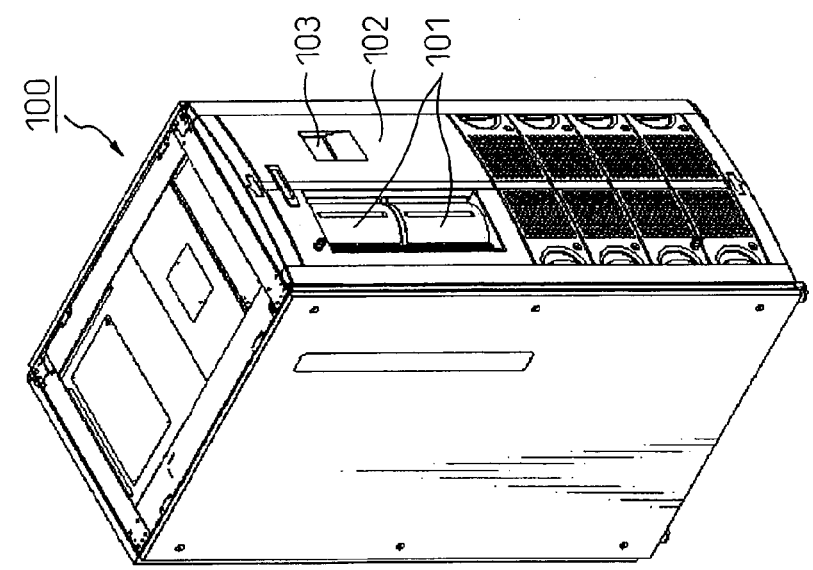
FIG. 1B is a rear perspective view taken from the rear side of the library apparatus shown in FIG. 1A.

FIG. 1A is a front view of a magnetic tape library apparatus 100 according to this invention, and FIG. 1B a rear view thereof. Medium access ports 101 for charging and discharging the library apparatus 100 with a magazine accommodating a plurality of cartridges having a magnetic tape built therein are arranged on the front panel of the library apparatus 100. In this embodiment, the library apparatus 100 has two medium access ports 101, by way of each of which the magazine can be charged/discharged. The cartridges accommodated in the library apparatus 100 can be replaced or the internal units checked also by opening a door 102. The door 102 of the library apparatus 100 has an operator panel 103, through which various operations including selection of the cartridges built in the apparatus can be performed.

Figure 2A:
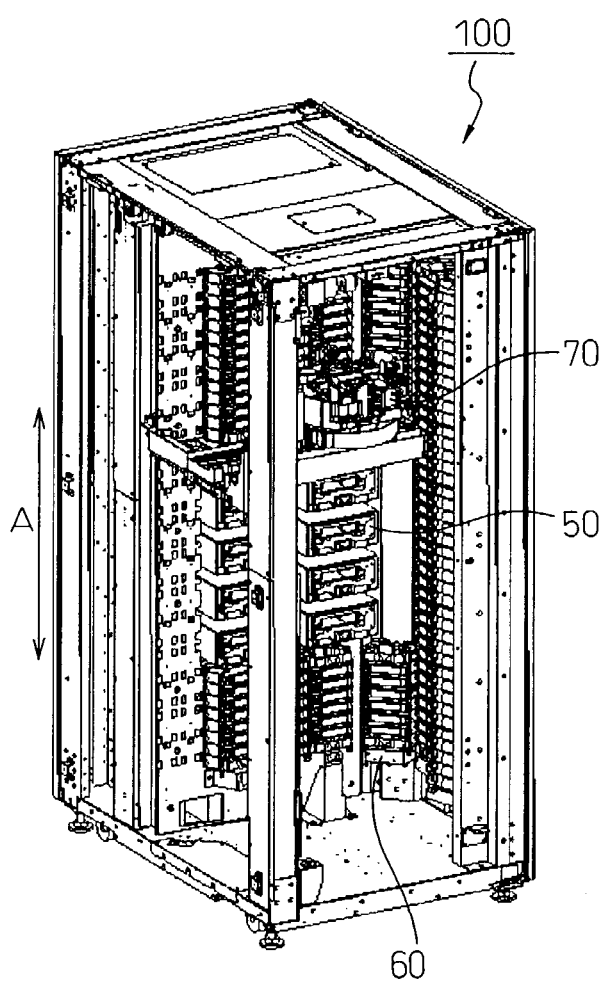
FIG. 2A is a perspective view showing the internal configuration of the library apparatus shown in FIG. 1A.
Figure 2B:
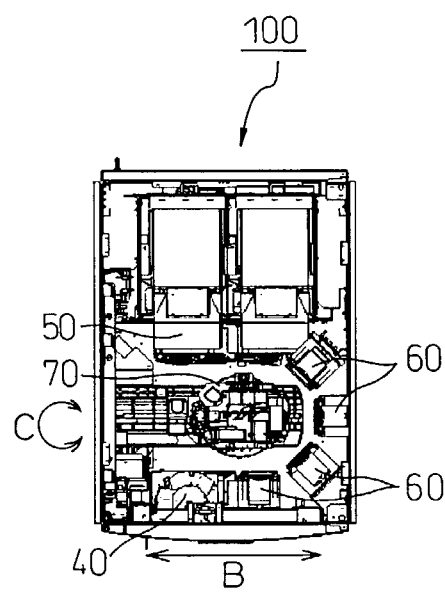
FIG. 2B is a plan view showing the internal configuration of the library apparatus shown in FIG. 2A.

FIG. 2A shows an internal configuration of the library apparatus 100 of FIG. 1A. FIG. 1B is a bird's eye view of the internal configuration of the library apparatus 100 shown in FIG. 1A. The library apparatus 100 has housed therein drive units 50 for recording and reproducing data in the cartridges 15 and cells 60 for accommodating a plurality of the cartridges 15. This embodiment has a total of eight drive units 50, two in each of four horizontal rows or four in each of two vertical columns. An accessor robot 70 for transporting the cartridges 15 between the drive units 50 and the cells 60 is arranged in the apparatus.

The library apparatus 100 is connected to at least a computer, a server and a personal computer through a network and, in response to an access from each of the devices, records the information in the cartridges or reproduces it from the cartridges. For this purpose, a plurality of the cartridges are accommodated in the internal cells 60 of the library apparatus 100. Whenever additional cartridges become necessary, the cartridges housed in the magazine 40 are transported to the cells 60 in the apparatus by the accessor robot 70 through the medium access ports 101 using the magazine 40 and charged into the library apparatus 100. In the case where the cartridges are retrieved from the library apparatus 100, on the other hand, the cartridges are taken out of the cells 60 in the library apparatus 100 by the accessor robot 70 and moved into the magazine 40. The cartridges can be finally retrieved by taking the magazine 40 out of the medium access ports 101.

The accessor robot 70 can move three-dimensionally in the library apparatus 100. Specifically, the accessor robot 70 moves vertically along the height of the library apparatus 100 as indicated by arrow A in the drawing on the one hand, and reciprocally along the width of the library apparatus 100 as indicated by arrow B on the other hand. Further, the hand portion of the accessor robot 70 is rotatable in the direction of arrow C. As a result, the accessor robot 70 can move to any required position of the cells 60 and the drive unit 50 in the library apparatus 100. At the position to which it is moved, the accessor robot 70 can pull out or charge a cartridge, and hold and transport it to a predetermined position.

The robot hand, as described in Japanese Patent Application No. 2002-207260 already filed by the present applicant, is so configured that the operation of opening/closing the claw portion for holding the cartridge and the operation of moving toward and away from the cartridge can be performed with a single drive source.

FIGS. 3A, 3B show a LTO medium 15A which is a type of cartridge 15 used with the library apparatus 100. FIG. 3A is a view taken from the back of the LTO medium 15A, and FIG. 3B includes a front view, a plan view, a rear view and a side view of the LTO medium 15A. As shown, the LTO medium 15A has outer dimensions 105.4 mm wide, 102 mm deep and 21.5 mm tall.

The LTO medium 15A has on the front side thereof a depressed portion 41A for identifying the medium, and has on each of the two rear sides thereof another depressed portion 41 to be held by the robot hand. Also, the LTO medium 15A has attached on the rear side thereof a bar code label 44 for identifying the cartridge 15. The depressed portion 41A formed on the front side of the LTO medium 15A is not extended over the entire height of the LTO medium 15A.

FIGS. 4A, 4B show a DLT medium 15B or another type of the cartridge 15 used with the library apparatus 100. FIG. 4A is a view taken from the back of the DLT medium 15B, and FIG. 4B includes a front view, a plan view, a rear view and a side view of the DLT medium 15B. The outer dimensions of the DLT medium 15B, as shown, are 105.4 mm wide, 105.8 mm deep and 25.4 mm tall.

The DLT medium 15B also has a depressed portion 41B on the front side thereof for identifying the medium, and further has on each side of the rear surface thereof a depressed portion 41 to be held by the robot hand. Further, the DLT medium 15B has on the front side thereof a lid 42 and a hinge 43 for opening/closing the lid 42, and has attached on the rear side thereof a bar code label 44 for identifying the cartridge 15. The depressed portion 41B formed on the front side of the DLT medium 15B is extended substantially over the entire area along the height of the DLT medium 15B.

In the magnetic tape library apparatus, it is common practice to attach the bar code label 44 on the rear surface of the LTO medium 15A and the DLT medium 15B. This bar code label 44 has written thereon the information on the data recorded in the particular medium. The bar code described on the bar code label is read by the CCD camera unit or the bar code reader unit built in the robot hand, and the backup work is carried out using the particular information.

Now, an explanation will be given of the basic configuration of the cartridge charge/discharge mechanism (CAS) 80 arranged in the medium access port 101 of the library apparatus 100, the configuration of the magazine 40 adapted to accommodate a plurality of the cartridges 15 and the operation thereof according to this invention shown in FIG. 1A.

Figure 5:
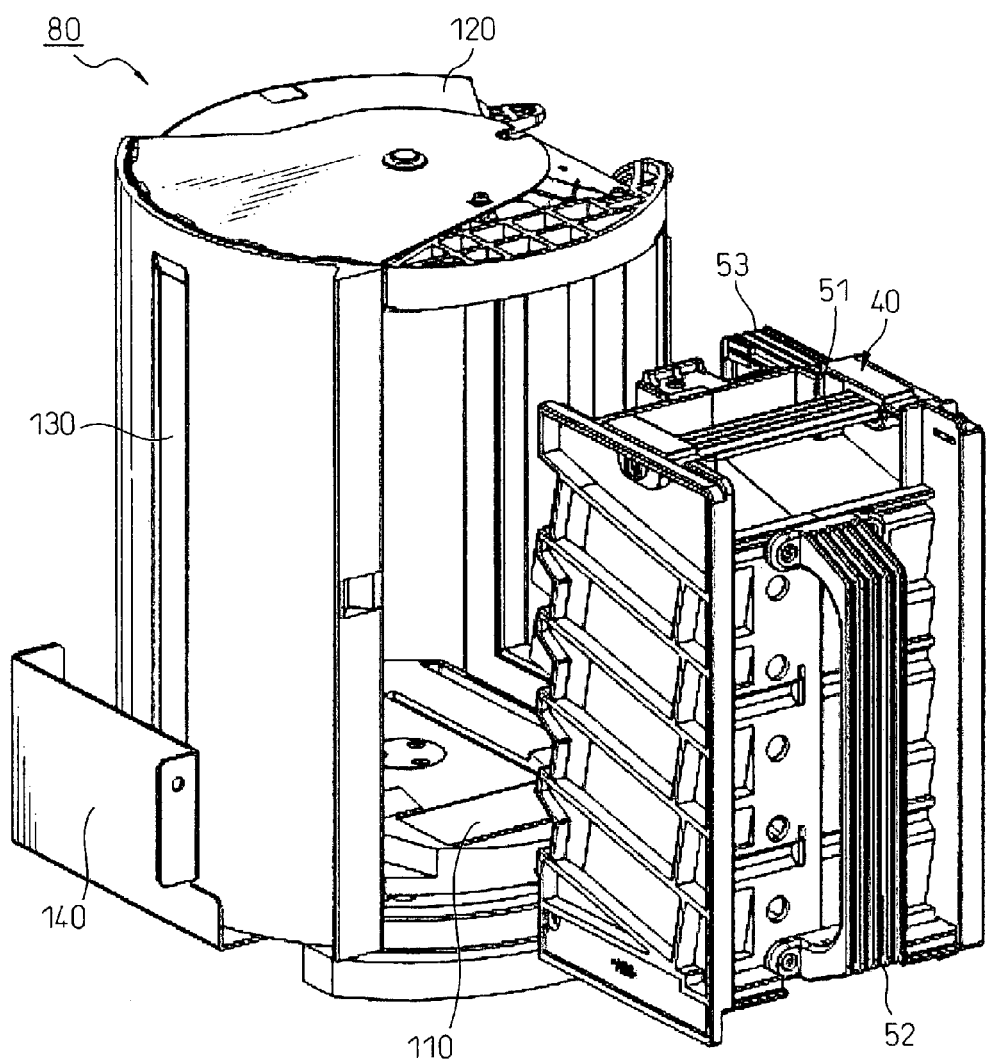
FIG. 5 is a perspective view showing the magazine and the basic configuration of the cartridge charge/discharge mechanism (CAS) of a library apparatus according to an embodiment of the invention.

FIG. 5 shows the basic configuration of the cartridge charge/discharge mechanism (CAS) 80 and the magazine 40 of the library apparatus 100 according to an embodiment of this invention. The CAS 80 is configured of four parts including a frame unit 110, an inner shutter unit 120, an outer shutter unit 130 and a shutter lock unit 140. The magazine 40 is inserted in the frame unit 110. First, the configuration of the magazine 40 will be explained with reference to FIGS. 6A, 6B.

As shown in FIGS. 6A, 6B, the magazine 40 includes a plurality of (five in the embodiment shown in FIGS. 6A, 6B) stages of cells 19 for accommodating the cartridges 15. The cartridge 15 can be inserted into or retrieved from each cell 19 only by way of the front of the magazine 40. An upper handle 51 is mounted on the upper surface of the magazine 40. This upper handle 51 is held by the operator at the time of carrying the magazine 40 by hand. A setting handle 52 making up a grip is mounted on the rear surface of the magazine 40. The setting handle 52 is held by the operator when setting the magazine 40 in the CAS 80 or retrieving the magazine 40 from the CAS 80.

Also, the upper surface of the magazine 40 is formed with a pair of positioning grooves 45 engageable with the magazine holding lever (described later) of the frame unit 110 when the magazine 40 is set in the CAS 80. A pair of walls 48 are formed on the front of the positioning grooves 45. On the other hand, the bottom surface of the magazine 40 is formed with legs 46, 47 adapted to fit in the guide grooves of the lower frame base described later when the magazine 40 is placed on the frame unit 110, and a shutter drive protrusion 55 is adapted to fit in the shutter drive lever arranged on the bottom plate of the inner shutter unit 120 through the guide grooves of the lower frame base to rotationally drive the inner shutter unit 120 at the time of the insert/discharge operation of the magazine 40.

The magazine 40 also includes a cartridge insertion error preventive lever 54 for preventing the cartridge 15 from being erroneously inserted, and a cartridge removal preventive lever 53 for preventing the cartridge 15 in the magazine 40 in transit from coming off. A pair of block portions 56 used for positioning and holding the magazine 40 in the CAS 80 are arranged at the lower part of the rear surface of the magazine 40.

FIG. 7A is an exploded view of the configuration of the frame unit 110 of the CAS 80, and FIG. 7B a view taken from the bottom of the frame unit 110 of FIG. 7A. The frame unit 110 includes a frame base 111, side frames 112, 113 mounted at opposed positions on the frame base 111, and an upper plate 114 suspended over the side frames 112, 113.

An inner shutter unit lock mechanism 90 and a shutter shaft 72 having mounted thereon the inner and outer shutter units are arranged on the back surface of the frame base 111. The upper plate 114 has mounted thereon a first gear 74, a shutter shaft 71 with the inner and outer shutter units mounted thereon, a gear shaft 73 for a second gear 75, and a pair of magazine holding levers 77. The magazine holding levers 77 are adapted to engage the positioning grooves 45 of the magazine 40 when the magazine 40 is set in the apparatus. A magazine sensor 76 is arranged beside the upper plate 114. The part defined by the frame base 111, the side frames 112, 113 and the upper plate 114 makes up a space for establishing direct communication and connection between the external space of the library apparatus and the working space of the accessor in the library apparatus. The first and second gears 74, 75 and the magazine holding levers 77 are used with the magazine holding mechanism and the magazine insertion error preventive mechanism and will be explained later.

Figure 8A:
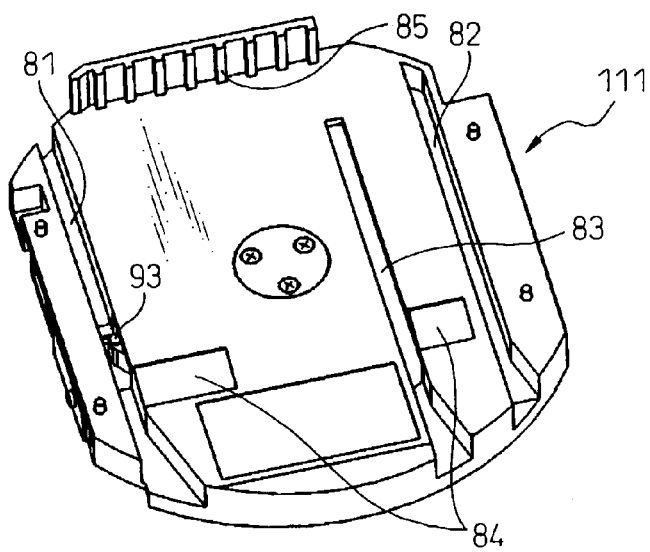
FIG. 8A is a perspective view of a lower base unit of the frame shown in FIG. 7A.
Figure 8B:
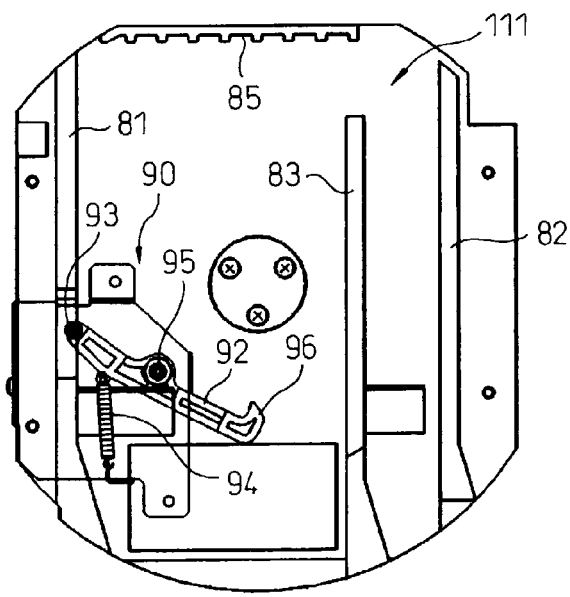
FIG. 8B is a plan view of the lower base of the frame shown in FIG. 8A.
Figure 8C:
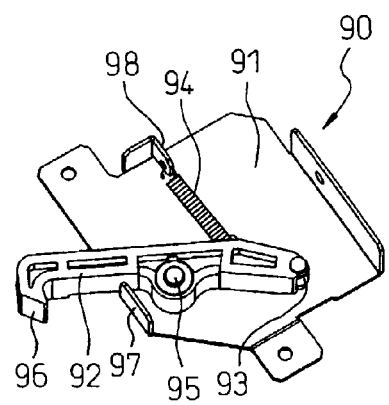
FIG. 8C is a perspective view showing a configuration of the inner shutter lock mechanism alone shown in FIG. 8B.

With reference to FIGS. 8A to 8C, the configuration of the frame base 111 will be explained in detail. The upper surface of the frame base 111 shown in FIG. 8A is formed with three grooves including first and second guide grooves 81, 82A adapted to be fitted with the legs 46, 47 of the magazine 40 being set and a third guide groove 83 adapted to be fitted with the shutter drive protrusion 55. The upper surface of the frame base 111 is also formed with two slopes 84 used for positioning and holding the magazine 40 on the one hand and with the insertion error preventive mechanism on the other. The guide groove 83 makes up, from midway, a slit pierced through the frame base 111. A wall 85 for preventing the excessive insertion of the magazine 40 is protruded at the rear end portion of the frame base 111.

As shown in the perspective view of FIG. 8B, a lock mechanism 90 functioning with the inner shutter unit 120 in operatively interlocked relation with the insert/discharge operation of the magazine 40 is mounted on the back of the frame base 111. The lock mechanism 90, as shown in FIG. 8C, is configured of a base portion 91, a lever 92 and a spring 94. The lever 92 is journaled on the rotary shaft 95 protruded from the base portion 91. Further, the lever 92 has mounted thereon one end of the tension spring 94 with the other end thereof mounted on the engaging portion 98 arranged on the base portion 91, thereby being normally kept pulled toward the engaging portion 98. On the other hand, a stopper 97 for stopping the rotation of the lever 92 due to the tension spring 94 is arranged on the base portion 91. As long as the magazine 40 is not charged into the CAS 80, the lever 92 is in contact with the stopper 97. Also, a hook portion 96 is formed at one free end of the lever 92, and a roller 93 is mounted at the other free end of the lever 92. When the magazine 40 is not charged, the roller 93 is projected into the first guide groove 81 of the frame base 111 as shown in FIG. 8B.

Figure 9A:
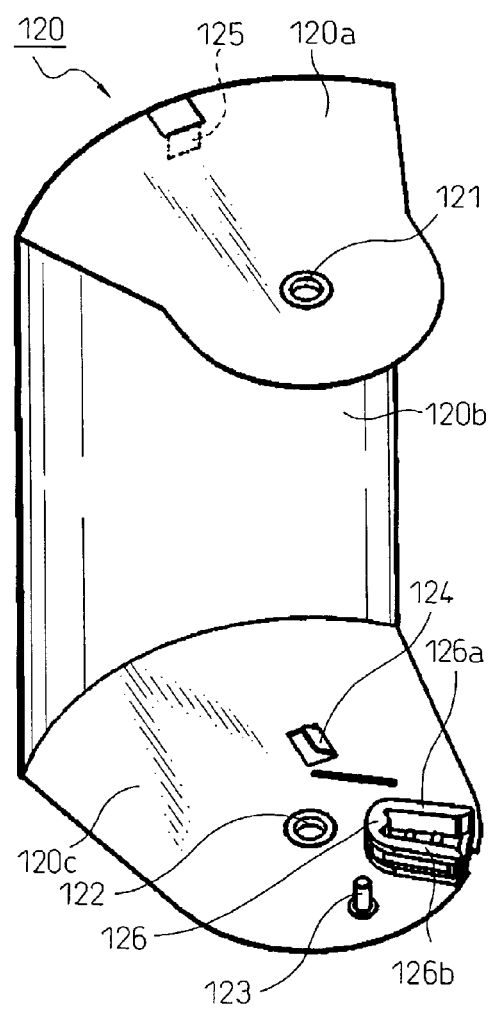
FIG. 9A is a perspective view schematically showing a configuration of the inner shutter unit.

FIG. 9A shows a configuration of the inner shutter unit 120. The inner shutter unit 120 is configured of a ceiling plate portion 120a, a bottom plate portion 120c and a shutter portion 120b having a curved wall between the ceiling plate portion 120a and the bottom plate portion 120c. The shutter portion 120b is for shutting off the communication space from the working space of the accessor when the magazine 40 is not charged in the CAS 80.

The shutter shaft 71 arranged on the upper plate 114 of the frame unit 110 is inserted through the axial hole 121 formed at the central portion of the ceiling plate portion 120a. On the other hand, the shutter shaft 72 arranged on the bottom surface of the frame base 111 of the frame unit 110 is inserted through the axial hole 122 formed at the central portion of the bottom plate portion 120c. A bushing is mounted on the axial holes 121, 122. Further, a flag 125 making up a shield plate is formed by cutting the ceiling plate portion 120a at the part of the upper plate 120a nearer to the shutter portion 120b.

A shutter drive lever 126 adapted to be fitted with the shutter drive protrusion 55 of the magazine 40 arranged through the guide groove 83 of the frame base 111 at the time of the insert/discharge operation of the magazine 40 is fixedly attached on the upper surface of the bottom plate portion 120c. The lever 126 is U-shaped and has one of the inner walls thereof making up an open portion 126a, and the other inner wall making up a closing portion 126b. Specifically, when charging the magazine 40, the shutter drive protrusion 55 advances into the lever 126 and, by depressing the open portion 126a, the shutter portion 120b is rotated in such a direction as to open the communication space described above while, by depressing the closing portion 126b at the time of discharging the magazine 40, the shutter portion 120b is rotated in such a direction as to close the communication space. In this way, the charge/discharge operation of the magazine 40 is converted into the rotational operation of the inner shutter unit 120 by the inner shutter drive lever 126.

Further, the inner shutter lock shaft 123 is protruded from the upper surface of the bottom plate portion 120c. In the absence of the magazine 40 in the CAS 80, this lock shaft 123 is used with the lock mechanism 90 to hold the closed state of the inner shutter unit 120. Also, the bottom plate portion 120c is provided with a protrusion 124 cut from the bottom plate portion 120c for catching the spring 107, so that the inner shutter unit 120 is normally kept energized by the spring 107 in such a direction as to close the communication space.

Figure 9B:
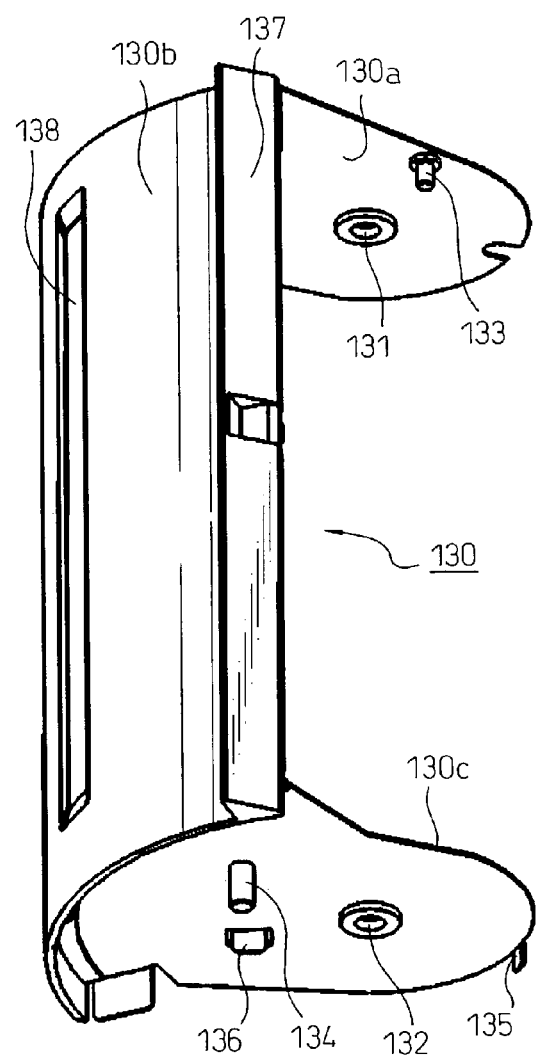
FIG. 9B is a perspective view schematically showing a configuration of the outer shutter unit.

FIG. 9B shows a configuration of the outer shutter unit 130. The outer shutter unit 130 also includes a ceiling plate portion 130a, a bottom plate portion 130c and a shutter portion 130b having a curved wall for shutting off the space for communication from the outer space into the apparatus at the time of accessing to the CAS 80 by the accessor. The outer shutter unit 130 is mounted in such a manner as to cover the inner shutter unit 120 from outside, and the turning radius of the shutter portion 130b is larger than that of the shutter portion 120b of the inner shutter unit 120.

A shutter shaft 71 provided on the upper plate 114 of the frame unit 110 is inserted through the axial hole 131 formed at the central part of the ceiling plate portion 130a. Also, a shutter shaft 72 provided on the bottom surface of the frame base 111 of the frame unit 110 is inserted through the axial hole 132 formed at the central portion of the bottom plate portion 130c. A bushing is mounted on the axial holes 131, 132. Further, a connecting shaft 133 is projected from the part in the neighborhood of the edge of the ceiling plate portion 130a. The connecting shaft 133 is located at a distance larger than the radius of the peripheral part of the axial hole 121 from the ceiling plate portion 120a of the inner shutter unit 120. The connecting shaft 133 is fitted in a connecting hole 74a formed at the forward end portion of the arm 74A of the first gear 74 arranged through the shutter shaft 71 on the upper plate 114 of the frame unit 110. With this configuration, the first gear 74A is rotated synchronously with the outer shutter unit 130.

A handle 137 is longitudinally provided at the end of the shutter portion 130b. A window 138 is longitudinally formed at the central part of the shutter portion 130b. The handle 137 is used by the operator for opening/closing the outer shutter unit 130. The second gear 75 mounted on the gear shaft 73 on the upper plate 114 of the frame unit 110 is connected with the first gear 74 and rotated in an operatively interlocked relation with the open/close operation of the outer shutter unit 130.

An outer shutter lock shaft 134, a flag 135 making up a shield plate for the shutter sensor 141 and a protrusion 136 are arranged on the lower surface of the bottom plate portion 130c. The outer shutter lock shaft 134 is locked to the lock lever 147 of the outer shutter lock mechanism 150 so that the outer shutter unit 130 is prohibited from opening when the accessor accesses the CAS 80. The flag 135 is for detecting the closed state of the outer shutter unit 130 by reaching the position of the shutter sensor 141 when the outer shutter unit 130 is closed. The protrusion 136 is for catching the spring 106. The outer shutter unit 130 is normally kept energized by the spring 106 in such a direction as to open when locked in the closed state by the outer shutter lock mechanism, and adapted to open when unlocked.

Figure 10:
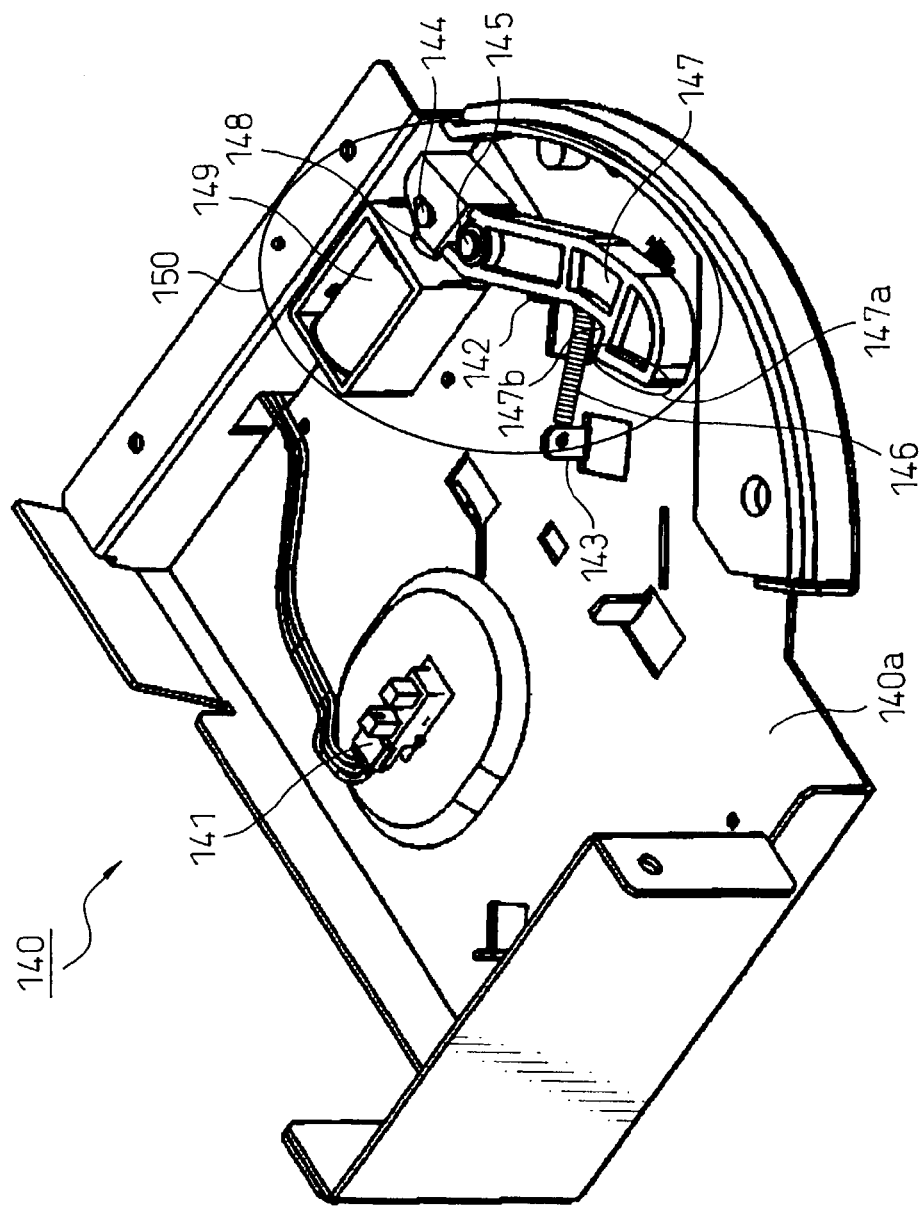
FIG. 10 is a perspective view schematically showing a configuration of the shutter lock unit.

FIG. 10 shows a configuration of the shutter lock unit 140. The shutter lock unit 140, as shown in FIG. 10, is configured of a base portion 140a and an outer shutter lock mechanism portion 150. The base portion 140a has mounted thereon a shutter sensor 141 and a rotary shaft 145 with the lock lever 147 of the outer shutter lock mechanism 150 mounted thereon. The base portion 140a, on the other hand, has formed thereon mounting holes, whereby the shutter lock unit 140 is screwed to the frame unit 110.

The outer shutter lock mechanism 150 is configured of a solenoid 149, a plunger 148, a lock lever 147 and a spring 146. The solenoid 149 is screwed to the base portion 140a, and the lever 147 is journaled on the rotary shaft 145 protruded from the base portion 140a. The lever 147 is coupled to the plunger 148 of the solenoid 149 through the mounting shaft 144 and rotated about the rotary shaft 145 by the attract operation of the solenoid 149. A flat portion 147a is formed at the end portion of the lever 147 far from the mounting shaft 144. A lock portion 147b is arranged adjacently to the flat portion 147a. A tension spring 146 for restoring the plunger 148 is interposed between the lever 147 and the engaging protrusion 143 of the base portion 140a. With this configuration, as long as the solenoid 149 remains in a normal state free of the attracting operation, the lever 147 is energized toward the stopper 142 by the tension spring 146 and in contact with the stopper 142.

Figure 11A:
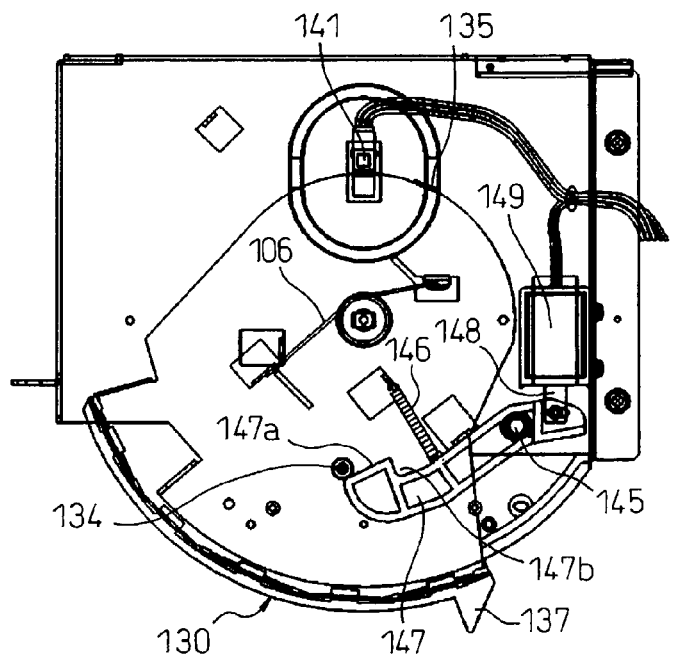
FIGS. 11A, 11B are plan views showing the sequential steps of the process for closing the outer shutter unit.
Figure 11B:
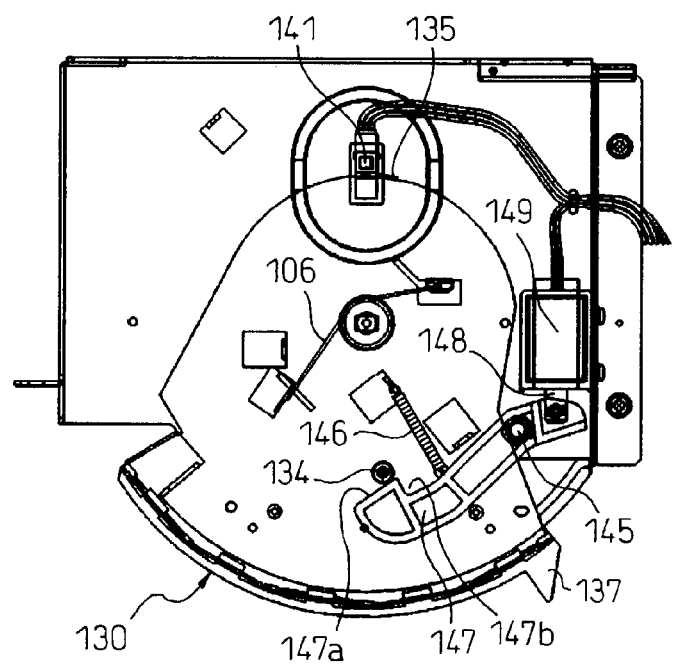
Figure 12:
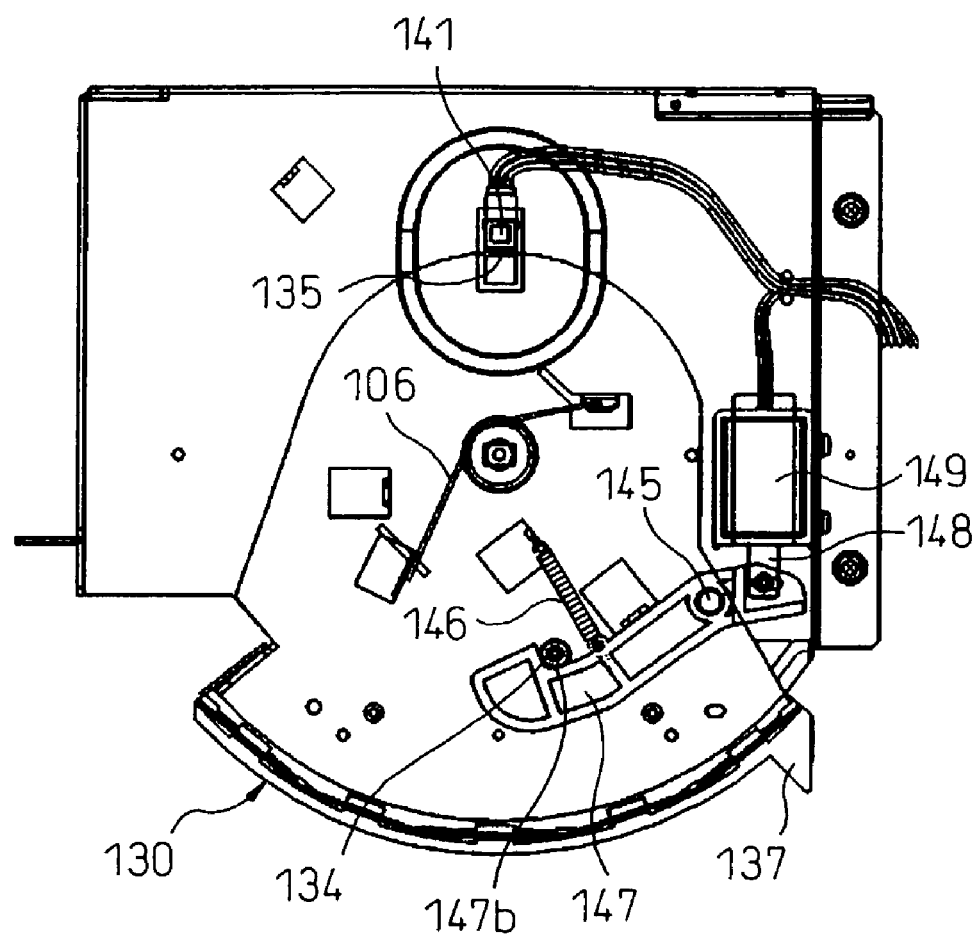
FIG. 12 is a perspective plan view showing the state in which the outer shutter unit shown in FIGS. 11A, 11B is closed and locked.
Figure 13:
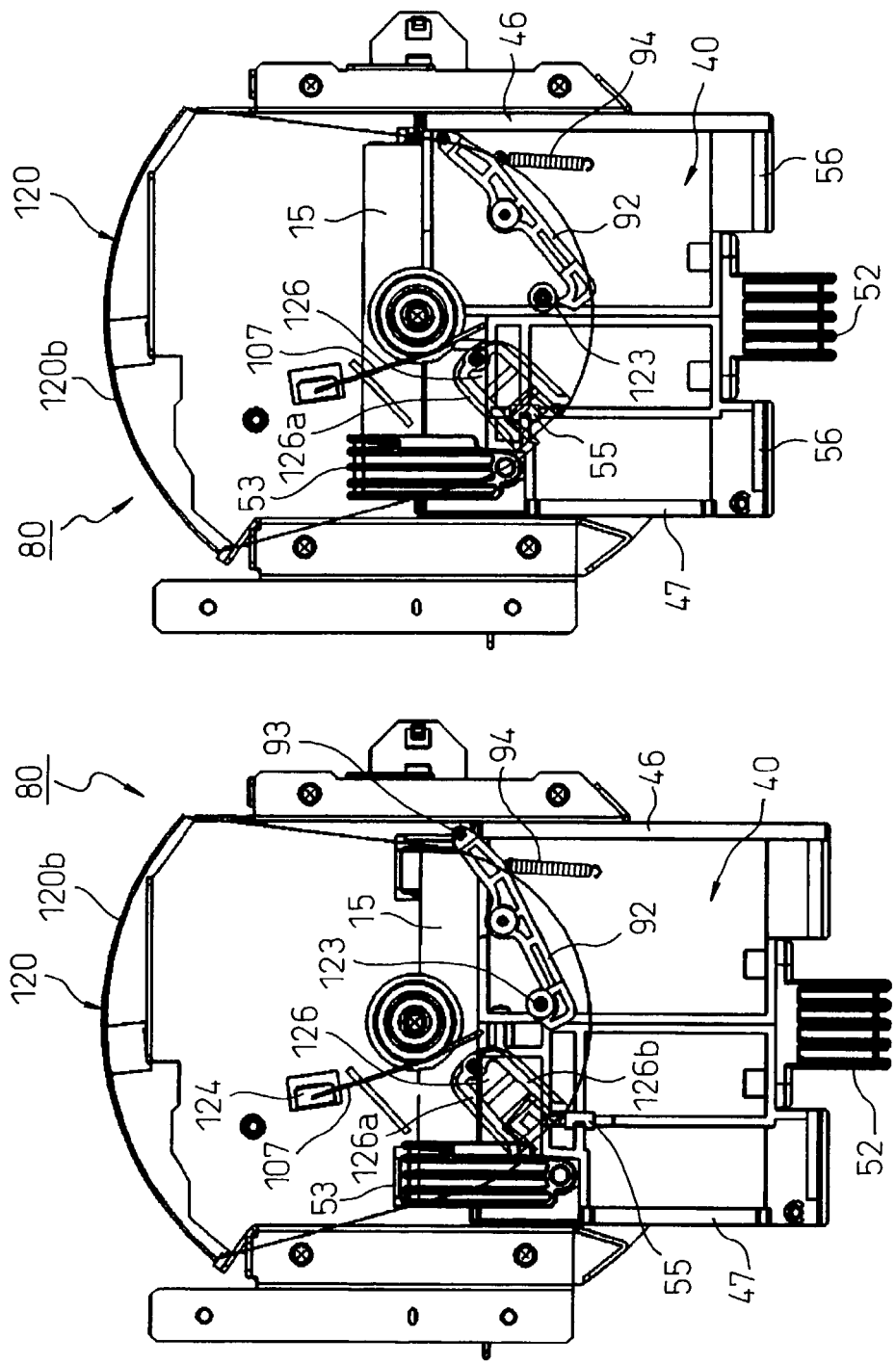
FIGS. 13A, 13B are perspective plan views showing the sequential steps of the operation of the inner shutter lock mechanism for inserting the magazine into the CAS according to the invention.

FIGS. 11A, 11B and 12 show the manner in which the shutter lock unit 140 in FIG. 10 locks the outer shutter unit 130 in closed state.

If the outer shutter unit 130 is rotated in the closing direction with the solenoid not energized, as shown in FIG. 11A, the outer shutter lock shaft 134 of the outer shutter unit 130 comes into contact with the flat portion 147a formed at the forward end of the lever 147. If the outer shutter unit 130 continues to be rotated in the closing direction, the flat portion 147a is pressed by the outer shutter lock shaft 134, and therefore, as shown in FIG. 11B, the lever 147 is rotated against the force of the spring 146.

In the case where the outer shutter unit 130 is rotated further in the closing direction, the outer shutter lock shaft 134 rides over the flat portion 147a. Then, the lever 147 is returned by the restoring force of the spring 146 and, as shown in FIG. 12, the outer shutter lock shaft 134 is locked to the lock portion 147b. As a result, the outer shutter unit 130 is locked by the shutter lock unit 140. Under this condition, the flag 135 of the outer shutter unit 130 covers the shutter sensor 141 of the shutter lock unit 140 and, therefore, the outer shutter unit 130 is closed, thereby allowing detection of the locked state.

The CAS 80 according to this embodiment has an inner shutter unit 120 arranged in such a manner that the working space of the accessor in the apparatus is closed as long as the magazine 40 is removed. Also, a lock mechanism is provided for preventing the shutter unit 120 from being opened by an external force or the like as long as the magazine 40 is not set in the CAS 80. This prohibits the erroneous insertion of the magazine or charging of foreign matter into the apparatus, thereby securing the safety of the apparatus. Thus, the operations of opening/closing the inner shutter unit 120 and locking/unlocking the lock mechanism are performed only in the case where the operator charges or discharges the magazine 40 into or out of the apparatus, and require no other driving force.

Figure 14:
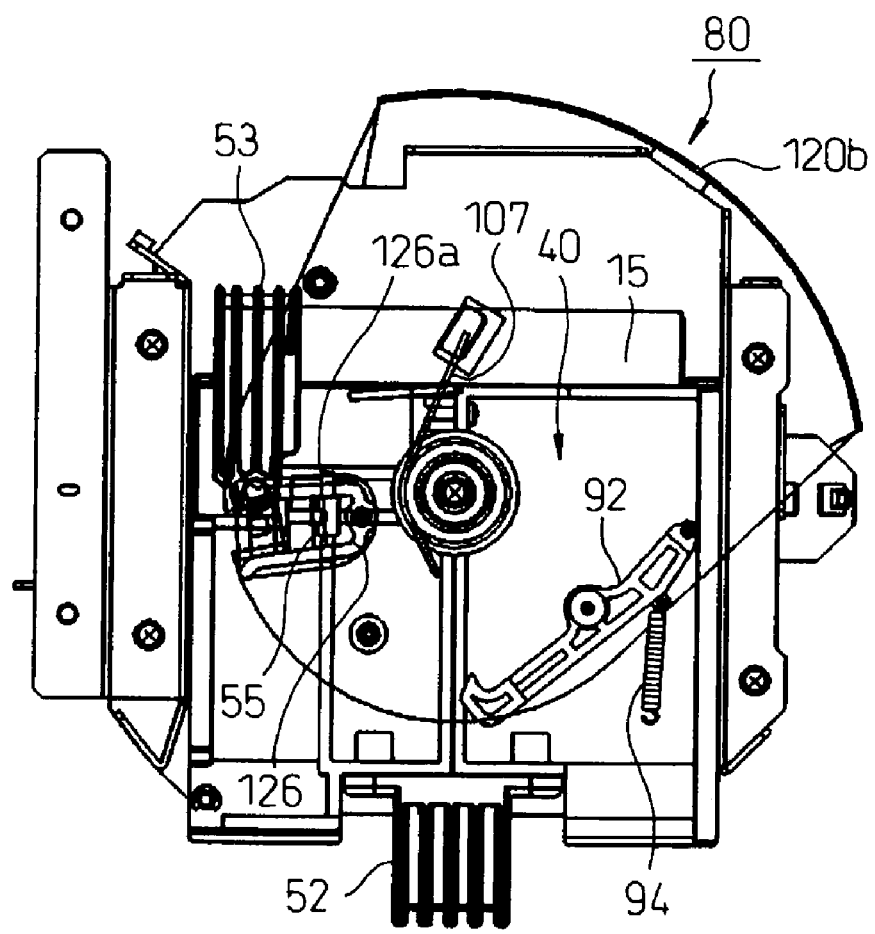
FIG. 14 is a perspective plan view showing the operation of opening the inner shutter unit by insertion of the magazine after the inner shutter lock mechanism unlocks the inner shutter unit.
Figure 15A:
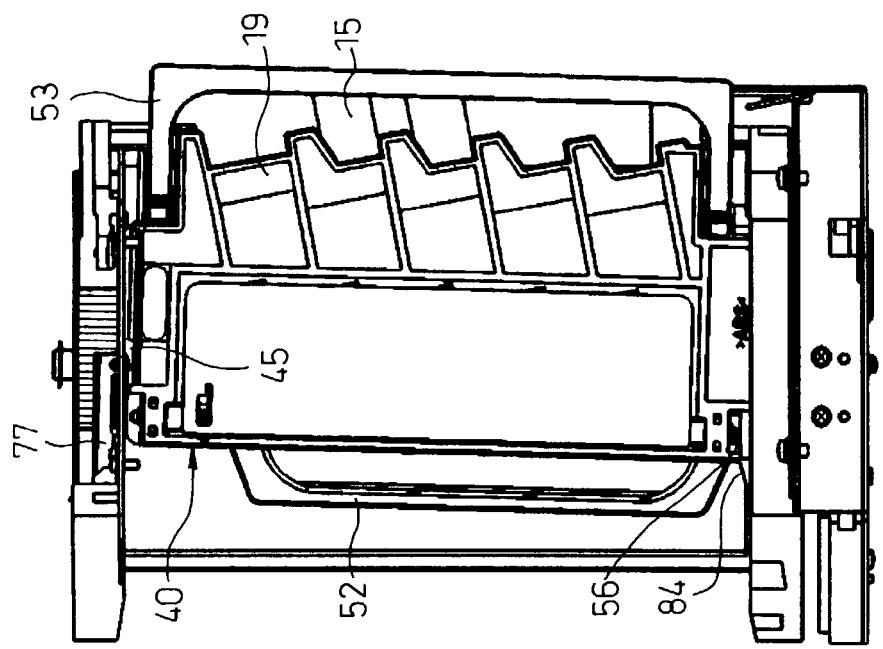
FIG. 15A is a perspective plan view showing that the inner shutter unit is opened to the full by insertion of the magazine.
Figure 15B:
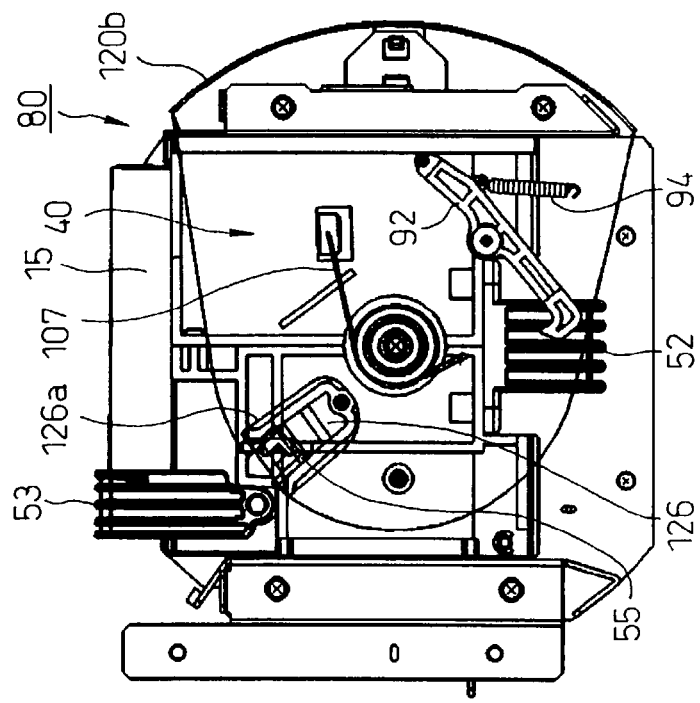
FIG. 15B is a perspective side view of the state shown in FIG. 15A.

A series of operations of the inner shutter unit lock mechanism 90 and the open/close mechanism of the inner shutter unit 120 performed by the operator for charging/discharging the magazine 40 will be explained below with reference to FIGS. 13A to 16B. FIGS. 13A, 13B, 14, 15A and 16A are bottom views of the CAS 80 for explaining the functions thereof. In these diagrams, a plurality of parts are not shown and some parts are shown in perspective to facilitate the understanding the relative positions of the magazine 40 and each mechanism. Also, FIG. 15B is a side view of the state shown in FIG. 15A, and FIG. 16B a side view of the state shown in FIG. 16A.

As long as the magazine 40 is not charged into the CAS 80, the inner shutter unit 120 is closed and locked in stationary state by the inner shutter unit lock mechanism 90. The magazine 40, with the handle 52 on the back thereof held by the operator, is transported to the magazine inlet of the CAS 80, and the legs 46, 47 of the magazine 40 are set in position in registry with the guide grooves 81, 82 of the frame base 111. From this state, the back handle 52 is held and the magazine 40 is pushed into the apparatus. Then, the magazine 40 makes the legs 46, 47 thereof advance into the guide grooves 81, 82 while being guided by the tapers of the inlet portions of the guide grooves 81, 82. This state is shown in FIG. 13A. In this state, a roller 93 arranged at the end portion of the lever 92 of the inner shutter unit lock mechanism 90 and projected into the guide groove 81 is pushed by the forward end of the leg 46 of the magazine 40.

When the magazine 40 is inserted further into the apparatus, the roller 93 is pushed to rotate the lever 92 and release the lock shaft 123 of the inner shutter unit 120 from the lever 92. With a further insertion of the magazine 40, as shown in FIG. 13B, the roller 93 runs along the side surface of the leg 46 and, therefore, the rotated lever 92 is held in position. Also, the advance of the magazine 40 causes the shutter drive protrusion 55 formed on the magazine 40 to be forced through the guide groove 83 and project into the back side of the frame base 111. The protrusion 55 enters the inner shutter drive lever 126 of the bottom plate portion 120c of the inner shutter unit located under the frame base 111 and comes into contact with an open portion 126a.

Upon further insertion of the magazine 40, the shutter drive protrusion 55 pushes the open portion 126a of the shutter drive lever 126. As a result, as shown in FIG. 14, the inner shutter unit 120 is rotated and opens the shutter portion 120b constituting a door. According to this embodiment, in order to reduce the internal space of the apparatus, the shutter portion 120b remains fixed in such a position as to set the magazine 40 in the apparatus as long as the inner shutter unit 120 is closed. Before the magazine 40 is inserted to an area where it interferes with the shutter portion 120b, therefore, the shutter portion 120b is required to move away from the interference area. According to this embodiment, the shutter drive protrusion 55 of the magazine 40 and the inner shutter drive lever 126 of the inner shutter unit 120 are so arranged that the insertion of the magazine 40 also causes the shutter portion 120b to rotate while keeping the relative portions of the shutter 120b and the magazine 40 out of contact with each other.

In the case where the magazine 40 is inserted into the magazine 40, as shown in FIG. 15B, a block portion 56 arranged at the lower part on the back of the magazine 40 comes into contact with a slope 84 located on the upper flat surface of the frame base 111, and the magazine 40 is tilted forward. Under this condition, as shown in FIG. 15A, the open portion 126a of the inner shutter drive lever 126 and the shutter drive protrusion 55 disengage from each other, thereby opening the shutter portion 120b to the full.

After that, in order not to return the shutter portion 120b which is now open, the magazine 40 is inserted further while being kept in contact with the forward end of the open portion 126a of the shutter drive lever 126 by the side surface of the shutter drive protrusion 55. Thus, the block portion 56 climbs up to the top of, and rides over, the slope 84 and is set in position as shown in FIG. 16B.

The magazine 40 is set in the position indicated in FIG. 16A. Specifically, in the case where the magazine 40 is set in position, the forward end portion of the magazine 40 is in a superposed relation with the closed position (indicated by dashed line in the drawing) of the shutter portion 120b. With the magazine 40 in this position, the cartridge 15 can be retrieved from the magazine 40 simply by moving the claw 6 of the hand 30 of the accessor robot to a holding position. As a result, the robot hand 30 is not required to be moved toward the cells 60 and the drive unit 50. Therefore, the movement and open/close operation of the claw 6 of the robot hand 30 can be accomplished with a single drive source. This makes it possible to reduce both the cost and size of the robot hand 30 while at the same time contributing to a reduced size of the library apparatus.

In retrieving the magazine 40 from the set position by the operation described above, the operation entirely reverse to that described above is performed. The operator, holding the handle 52 on the back of the magazine 40, lifts up the magazine 40 with the forward end of the leg 46 as a supporting point into the state shown in FIG. 15B. With the block portion 56 riding on the slope 84, the magazine 40 is pulled outward. In this way, the magazine 40 can be discharged.

When the magazine 40 is pulled with the block portion 56 riding on the slope 84, the shutter drive protrusion 55 comes to engage the closing portion 126b of the inner shutter drive lever 126 of the inner shutter unit 120, as shown in FIG. 15A. When the magazine 40 is pulled further, the shutter drive protrusion 55 pushes the closing portion 126b of the inner shutter drive lever 126. Thus, the inner shutter unit 120 is rotated and closes the shutter portion 120b after assuming the states shown in FIGS. 14 and 13B.

A further pull of the magazine 40 causes the shutter drive protrusion 55 to come off from the closing portion 126b of the shutter drive lever 126 and, as shown in FIG. 13A, the shutter portion 120b is closed up. Under this condition, the side portion of the leg 46 of the magazine 40 also comes off from the roller 93 at the end of the lever 92. Thus, the lever 92 is released, returned by the restoring force of the spring 94, and comes to engage the inner shutter lock shaft 123 of the inner shutter unit 120 thereby to lock the inner shutter unit 120.

According to this embodiment, the inner shutter unit 120 is normally kept energized in such a direction as to be closed by the spring 107. Without the closing portion 126b of the inner shutter drive lever 126, therefore, the inner shutter unit 120 performs an operation in reverse order from the insert operation by pulling the magazine 40 in the discharging direction and, thereby, is automatically closed to a locked state.

Figure 17A:
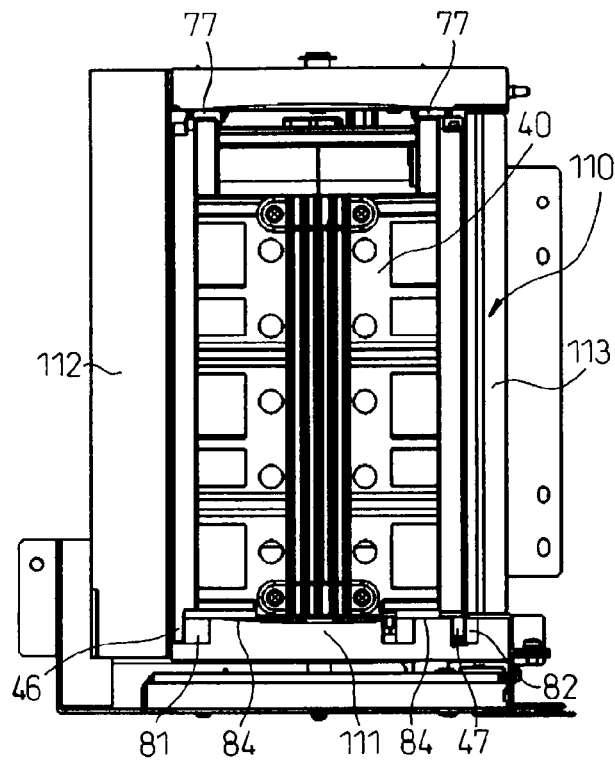
FIG. 17A is a front view of the state of FIG. 16B taken from the insertion side of the magazine.

Next, an explanation will be given of the mechanism for holding the magazine 40 set in position by the insert operation described above. The magazine 40 inserted into the apparatus, as shown in FIG. 17A, is held in position horizontally within a tolerable range by the guide grooves 81, 82 of the frame 111 and the side frames 112, 113 of the frame unit 110 on the one hand and longitudinally within a tolerable range by the front wall surface 85 (FIG. 8A) and the stepped surface of the slope 84 of the frame base 111 on the other hand. Also, in the direction along the height, the magazine 40 is held in position by the legs 46, 47 on the bottom surface of the guide grooves 81, 82 of the frame base 111 at the lower part thereof, on the one hand and is energized downward by the magazine holding lever 77 in mesh with the positioning groove 45 (FIG. 6A) formed in the upper part of the magazine 40, on the other hand (a spring for applying an energizing force is built in the lower part of the magazine holding lever 77).

The energizing force of the spring built in the magazine holding lever 77 is not very strong as the magazine holding lever 77 is required to be vertically movable at the time of charge/discharge operation of the magazine 40. Upon application of an external force from the front of the magazine 40, therefore, the magazine 40 would be tilted backward and, hence, the need of the magazine holding mechanism. For this reason, according to this embodiment, the magazine 40 is held by the operator closing the outer shutter unit 130 after charging and setting the magazine 40. This operation will be explained with reference to FIGS. 18A, 18B.

As described above, the outer shutter unit 130 is connected to the arm 74A of the first gear 74 by the connecting shaft 133 arranged on the ceiling plate portion 130b, so that the outer shutter unit 130 and the arm 74A are rotated in synchronism with each other. Also, the second gear 75 mounted on the gear shaft 73 on the top of the frame unit 110 is connected in mesh with the first gear 74, and therefore rotated in an operatively interlocked relation with the open/close operation of the outer shutter unit 130.

Figure 17B:
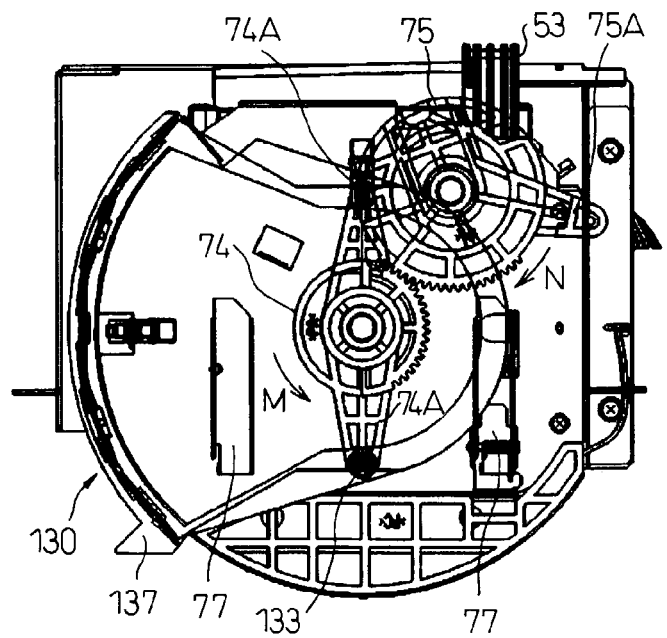
FIG. 17B is a perspective plan view of the CAS taken from above in the state of FIG. 17A.
Figure 18A:
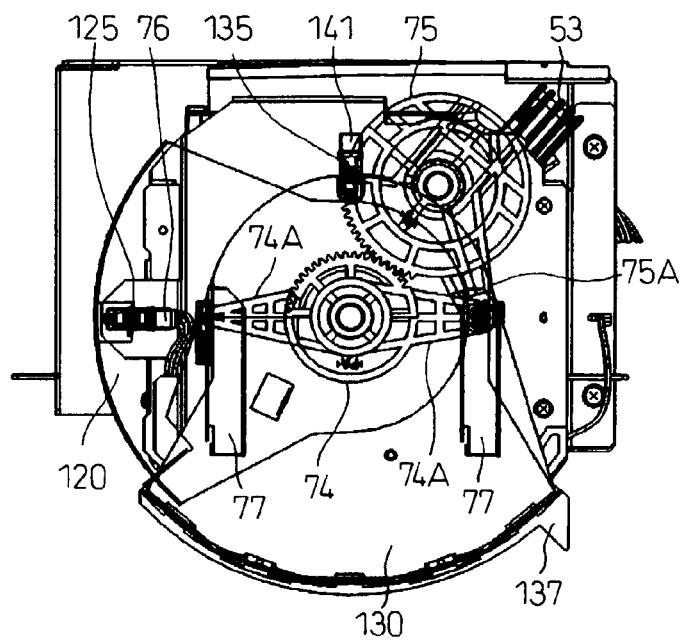
FIG. 18A is a perspective plan view showing the state in which the outer shutter unit is closed from the state of FIG. 17B.
Figure 18B:
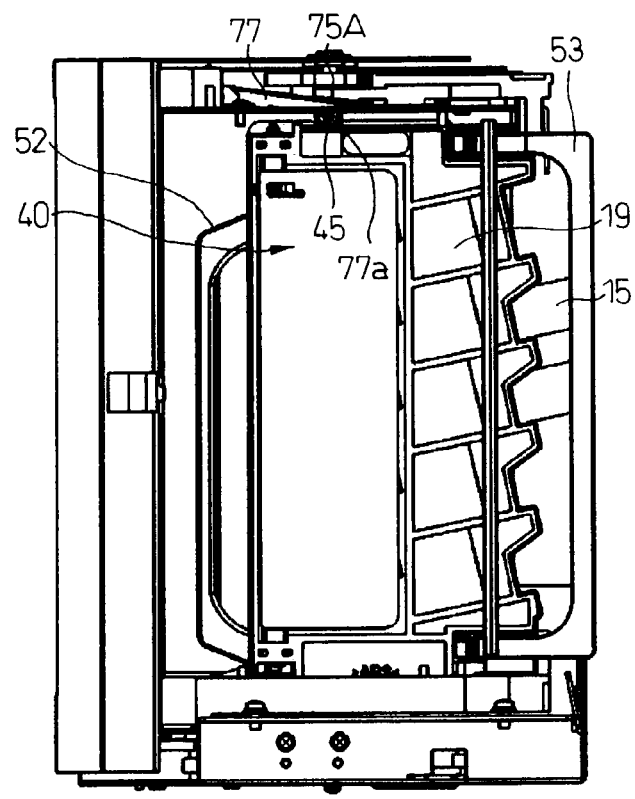
FIG. 18B is a perspective side view of the state shown in FIG. 18A.

If the operator rotates the outer shutter unit 130 using the handle 137 from the state shown in FIG. 17B, the first gear 74 is rotated in the direction of arrow M by the connecting shaft 133, and the second gear in mesh with the first gear 74 is rotated in the direction of arrow N. As a result, the arm 74A of the first gear 74 and the arm 75A of the second gear 75 are rotated so that, as shown in FIG. 18A, the arm 74A of the first gear 74 is arranged on the magazine holding lever 77, while the arm 75A of the second gear 75 is arranged on the arm 74A of the first gear 74. Consequently, as shown in FIG. 18B, the upward rotation of the magazine holding lever 77 is inhibited, and the magazine 40 is held without being tilted backward.

While the magazine 40 is held in this way, the inner shutter unit 120 is open and the outer shutter unit 130 closed. Under this condition, the magazine sensor 76 arranged on the upper surface of the frame unit 110 and the shutter sensor 141 arranged on the shutter lock unit 110 are shielded by the flag 125 of the inner shutter unit 120 and the flag 135 of the outer shutter unit 130, respectively. Thus, the state of the magazine 40 being held can be detected.

As described above, according to this embodiment, the magazine 40 is held by closing the outer shutter unit 130. As a result, this embodiment comprises a magazine charge error preventive mechanism whereby it becomes possible to close the outer shutter unit 130 only when the magazine 40 is inserted accurately into the set position. This mechanism will be explained below.

Figure 19:
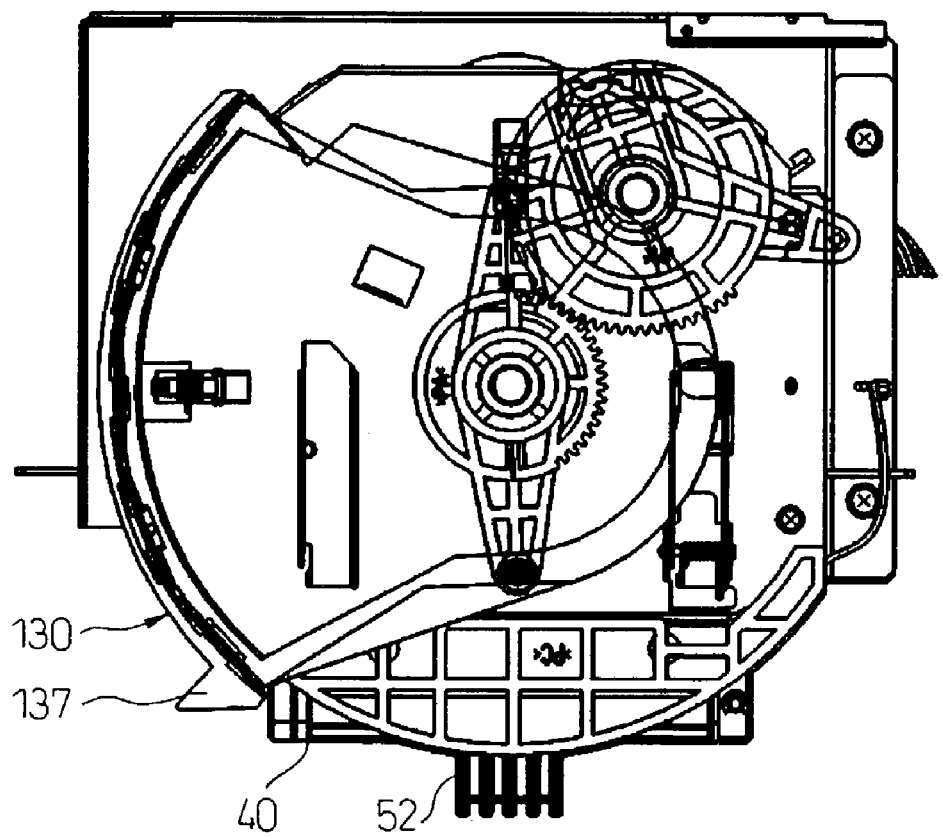
FIG. 19 is a perspective plan view for explaining that the outer shutter unit cannot be closed in the case where the insertion of the magazine is stopped with a part of the magazine held outside of the CAS.

First, in the case where the magazine 40 is stopped midway of insertion and the handle 52 of the magazine 40 is exposed as shown in FIG. 19, an attempt to close the outer shutter unit 130 would fail as the handle 13 and the magazine 40 would interfere with each other.

Next, the operation of the magazine charge error preventive mechanism will be explained with reference to a case in which the magazine 40 being inserted further over the area of interference between the handle 137 and the magazine 40 is stopped as shown in FIG. 20A. In this case, as shown in FIG. 18B, the roller 77a arranged on the front of the magazine holding lever 7 is not in the positioning groove 45 formed at the upper part of the magazine 40. Specifically, in this condition, as shown in FIG. 20B, the wall surface 48 (FIG. 6A) located on the front of the positioning groove 5d of the magazine 40 pushes up the roller 77a of the magazine holding lever 77. As compared with the case in which the roller 77a is in mesh with the positioning groove 45 at the set position of the magazine 40, therefore, the front portion of the magazine holding lever 77 is projected from the upper surface of the frame unit 110.

Under this condition, if an attempt is made to close the outer shutter unit 130, as shown in FIG. 20A, the arm 75a of the second gear 75 operatively interlocked with the outer shutter unit 130 interferes with the front part of the magazine holding lever 77, so that the second gear 75 cannot rotate any more. As a result, the outer shutter unit 130 cannot be closed. According to this embodiment, as described above, the outer shutter unit 130 cannot be closed unless the magazine 40 is inserted in position. Thus, the likelihood of the magazine 40 being inserted in an inappropriate way into the CAS 80 is eliminated, and an operating failure of the accessor in the CAS 80 can be prevented.

Finally, an explanation will be given of the mechanism whereby the cartridge removal preventive lever 53 of the magazine 40 shown in FIG. 6A is displaced so as not to prevent the operation of retrieving the cartridges 15 from the cells 19 or inserting the cartridges 15 into the cells 19 in the case where the magazine 40 is inserted in position in the CAS 80.

Figure 21A:
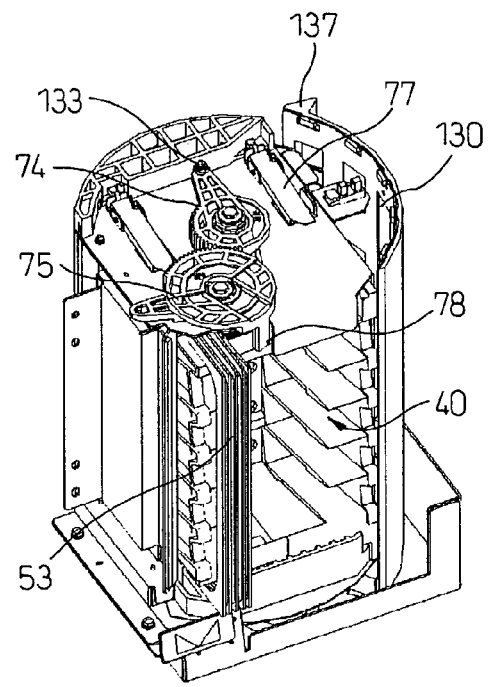
FIG. 21A is a perspective view, as taken from the interior of the apparatus, showing the state of FIG. 17B in which the magazine is completely inserted into the apparatus.

FIG. 21A is a view taken from inside of the CAS 80 in the state of FIG. 17B in which the magazine 15 has been fully inserted into the CAS 80. Under this condition, the outer shutter unit 130 is in an open state. The cartridge removal preventive lever 53 is normally kept pressed in the closing direction (the direction in which the cartridge is prevented from coming off) by the tension spring 57 shown in FIG. 6A. Therefore, the cartridge 15, after being inserted into the magazine 40, is prevented from jumping out even when the magazine 40 is shaken.

Figure 21B:
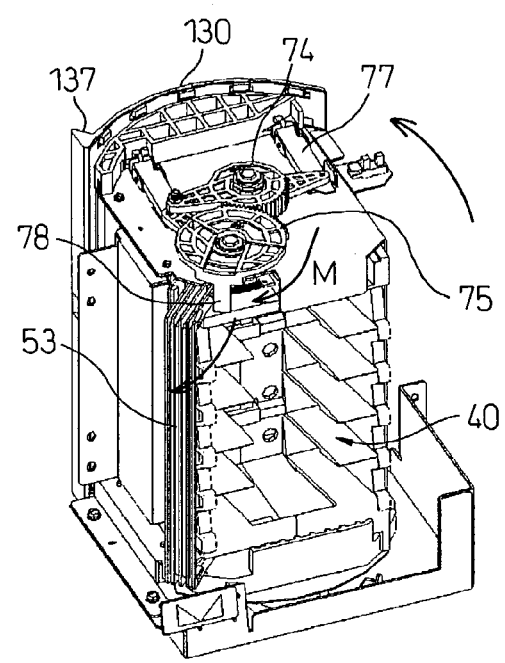
FIG. 21B is a perspective view showing the state in which the outer shutter unit is closed from the state of FIG. 21A.

On the other hand, the second gear 75 described above is provided with a release lever 78 located in front of the magazine 40 under the condition shown in FIG. 21A. As described above, in the case where the outer shutter unit 130 is closed from the state of FIG. 17B, the second gear 75 is rotated in the direction of arrow M. As a result, as shown in FIGS. 18A and 21B, the rotation of the second gear 75 causes the cartridge removal preventive lever 53 to rotate against the force of the tension spring and to retreat to the position where the inlet of the magazine 40 for the cartridges 15 is not closed. Consequently, it becomes possible for the accessor in the CAS 80 to access the cartridges 15 accommodated in the magazine 40.

In the embodiments described above, the magnetic tape cartridge is taken as an example. Nevertheless, the storage media built in the cartridge are not specifically limited.

What is claimed is:

1. A library apparatus comprising a drive unit for handling a plurality of cartridges each accommodating a storage medium, a plurality of cells for accommodating said cartridges, an accessor for transporting said cartridges and a mechanism capable of charging/discharging at least a magazine adapted to accommodate a plurality of said cartridges, said cartridges being charged into or discharged from said apparatus by said magazine;

wherein a frame unit having a space for insertion of said magazine is arranged in a communication space for establishing communication between an internal space for operation of said accessor and an external space of said library apparatus;

wherein an inner shutter for opening/closing the internal space side of said space for insertion of said magazine is mounted on said frame unit thereby to make up a charge/discharge mechanism for said magazine;

wherein, as long as said magazine is not set, said inner shutter remains closed by occupying the area which might be occupied by said magazine after being set, said inner shutter having a first engaging portion adapted to engage a part of said magazine; and wherein said magazine has a second engaging portion adapted to engage said first engaging portion, said first engaging portion and said second engaging portion being adapted to engage each other when said magazine is inserted into said insertion space, said inner shutter being opened by the operation of inserting said magazine, said inner shutter being fully opened in the case where said magazine reaches a set position in said insertion space.

2. A library apparatus according to claim 1,
wherein, in the case where said magazine is pulled out in the direction of discharge from said set position, said first engaging portion and said second engaging portion engage each other, said inner shutter being closed in operatively interlocked relation with the discharge of said magazine.

3. A library apparatus according to claim 1,
wherein said inner shutter is energized in such a direction as to close the inner space side of said insertion space of said frame unit by a spring, said inner shutter being closed by the energizing force of said spring in the case where said magazine is pulled out in the direction of discharge from said set position.

4. A library apparatus according to claim 1,
wherein said inner shutter constitutes a pivoted door mounted on rotary shafts protruded from said frame unit, said inner shutter having a curved shutter portion;
wherein said first engaging portion constitutes a substantially U-shaped lever fixed on the bottom plate portion of said inner shutter;
wherein said second engaging portion constitutes a protrusion formed on the bottom portion of said magazine; and
wherein an opening of said lever is located on a line along which said protrusion advances when said magazine is inserted into said insertion space.

5. A library apparatus according to claim 1,
wherein a lock mechanism for locking said inner shutter is arranged under said frame unit; and
wherein said lock mechanism locks said inner shutter in a closed state when said magazine is not set and unlocks said inner shutter thereby to allow said inner shutter to open/close when said magazine is charged into said insertion space, said lock mechanism further locking and holding said inner shutter in closed state when said inner shutter closes said insertion space in operatively interlocked relation with the discharge of said magazine from said insertion space.

6. A library apparatus according to claim 1,
wherein a plurality of positioning grooves are formed on the upper surface of said magazine, and the upper plate of said frame unit has a plurality of holding levers adapted to engage said positioning grooves when said magazine reaches said set position;

wherein the upper plate of said frame unit with said rotary shaft has a first gear inserted in said rotary shaft operatively interlocked with the motion of said outer shutter and a second gear in mesh with said first gear; and wherein when said magazine is set in position, said outer shutter is closed, so that said first gear and said second gear are driven in operatively interlocked relation with each other, and said holding levers are fixed by a pair of arms protruded from said first gear and an arm protruded from said second gear thereby to fix the position of said magazine.

7. A library apparatus according to claim 6, wherein in the case where said magazine is not set in position, said arm protruded from said second gear is in contact with at least one of said holding levers, said outer shutter being prevented from moving in the closing direction as long as said is in contact with said holding lever.

8. A library apparatus according to claim 3, wherein a cartridge removal preventive lever for preventing the cartridges from jumping out of said magazine is arranged at the cartridge inlet/outlet of said magazine in the direction crossing said cartridge inlet/outlet, said cartridge removal preventive lever retreating from the front of said cartridge inlet/outlet by the operation of closing said outer shutter when said magazine is set in position.

9. A library apparatus according to claim 1, further comprising an outer shutter for opening/closing the external space side of said insertion space of said frame unit, wherein said outer shutter makes up a pivoted door mounted on the rotary shafts protruded from said frame unit outside of said inner shutter, said outer shutter including a curved shutter portion having a larger radius than said curved shutter portion of said inner shutter.

10. A library apparatus according to claim 1, wherein a plurality of positioning grooves are formed on the upper surface of said magazine, and the upper plate of said frame unit has a plurality of holding levers adapted to engage said positioning grooves when said magazine reaches said set position, wherein the upper plate of said frame unit with said rotary shaft inserted therein has a first gear operatively interlocked with the motion of said outer shutter and a second gear in mesh with said first gear, and wherein when said magazine is set in position, said first gear and said second gear are operated in collaboration with each other by closing said outer shutter, and said holding levers are fixed using said arm protruded from said first gear and said arm protruded from said second gear thereby to fix the position of said magazine.

11. A library apparatus according to claim 4, wherein a lock mechanism for locking said inner shutter is arranged under said frame unit, and wherein said lock mechanism locks said inner shutter in a closed state when said magazine is not set, said lock mechanism being unlocked thereby to allow said inner shutter to open/close by charging said magazine into said insertion space, said lock mechanism further locking and holding said inner shutter in closed state when said inner shutter closes said insertion space in operatively interlocked relation with the discharge of said magazine from said insertion space.

12. A library apparatus according to claim 5, wherein a plurality of positioning grooves are formed on the upper surface of said magazine, and the upper plate of said frame unit has a plurality of holding levers adapted to engage said positioning grooves when said magazine reaches said set position, wherein said upper plate of said frame unit with said rotary shaft inserted therein has a first gear operatively interlocked with the motion of said outer shutter and a second gear in mesh with said first gear, and wherein said first gear and second gear are operated in collaboration with each other by closing said outer shutter when said magazine is set in position, said holding levers being fixed using the arm protruded from said first gear and the arm protruded from said second gear thereby to fix the position of said magazine.

13. A library apparatus according to claim 2, further comprising an outer shutter for opening/closing the external space side of the insertion space of said frame unit, wherein said outer shutter makes up a pivoted door mounted on the rotary shafts protruded from said frame unit outside of said inner shutter, said outer shutter including a curved shutter portion having a larger radius than said curved shutter portion of said inner shutter.

14. A library apparatus according to claim 3, wherein a plurality of positioning grooves are formed on the upper surface of said magazine, and the upper plate of said frame unit has a plurality of holding levers adapted to engage said positioning grooves when said magazine reaches said set position, wherein the upper plate of said frame unit with said rotary shaft inserted therein has a first gear operatively interlocked with the motion of said outer shutter and a second gear in mesh with said first gear, and wherein said first gear and second gear are operated in collaboration with each other by closing said outer shutter when said magazine is set in position, said holding levers being fixed using the arm protruded from said first gear and the arm protruded from said second gear thereby to fix the position of said magazine.

\* \* \* \* \*